(12) United States Patent
Tomcak et al.

(10) Patent No.: US 7,635,294 B2
(45) Date of Patent: Dec. 22, 2009

(54) METHOD AND APPARATUS TO LOAD AND REMOVE BONES FROM PRIMALS

(75) Inventors: Jerrad L. Tomcak, Sioux City, IA (US); John E. Johnson, Jefferson, SD (US); Craig S. Donnelly, Sioux City, IA (US); Jason W. Tomcak, Lawton, IA (US); William I. Faulder, Sioux City, IA (US)

(73) Assignee: Tyson Foods, Inc., Springdale, AK (US)

( * ) Notice: Subject to any disclaimer, the term of this patent is extended or adjusted under 35 U.S.C. 154(b) by 467 days.

(21) Appl. No.: 11/460,688

(22) Filed: Jul. 28, 2006

(65) Prior Publication Data

US 2008/0026684 A1    Jan. 31, 2008

(51) Int. Cl.
  *A22C 17/00*    (2006.01)
(52) U.S. Cl. ..................................... 452/135
(58) Field of Classification Search ............. 452/135, 452/149–160, 166, 167, 170, 171
  See application file for complete search history.

(56) References Cited

U.S. PATENT DOCUMENTS

| | | | |
|---|---|---|---|
| 3,593,369 A | 7/1971 | Anderson et al. | |
| 3,837,699 A | 9/1974 | Overstreet et al. | |
| 3,916,484 A * | 11/1975 | Kennedy | 452/159 |
| 3,992,734 A | 11/1976 | Chiron et al. | |
| 4,109,347 A | 8/1978 | Jolin | |
| 4,134,181 A | 1/1979 | Schneider, Jr. | |
| 4,234,997 A | 11/1980 | Koyama | |
| 5,195,923 A | 3/1993 | Rankin et al. | |
| 5,226,850 A | 7/1993 | Klaassen | |
| 5,314,375 A * | 5/1994 | O'Brien et al. | 452/157 |
| 5,611,727 A * | 3/1997 | Dufour et al. | 452/153 |
| 5,746,648 A | 5/1998 | Baeyen et al. | |
| 5,855,507 A | 1/1999 | Fisher et al. | |
| 6,126,535 A | 10/2000 | Post | |
| 6,860,804 B2 | 3/2005 | Kruger | |
| 2003/0008608 A1 | 1/2003 | Scalia et al. | |
| 2004/0029514 A1 | 2/2004 | Kruger | |
| 2004/0058636 A1 | 3/2004 | Hinsch et al. | |
| 2005/0059333 A1 | 3/2005 | Annema et al. | |

FOREIGN PATENT DOCUMENTS

EP    1059037 A    12/2000

* cited by examiner

*Primary Examiner*—Thomas Price
(74) *Attorney, Agent, or Firm*—Mark E. Stallion, Esq.; Husch Blackwell Sanders LLP

(57) ABSTRACT

An automated apparatus and method for processing and removing bones from primal and sub-primal cuts of meat where one embodiment of the invention is specifically adapted to remove the bones from the chuck blade portion of meat or other similar meat cuts. The invention is to provide a cutting means and fixture which will eliminate the need for manually lifting the primal cuts while securely clamping the primal into a device which will function as the transporter and said invention has alignment device for bone removal to assist in guiding a saw blade for bone removal.

20 Claims, 21 Drawing Sheets

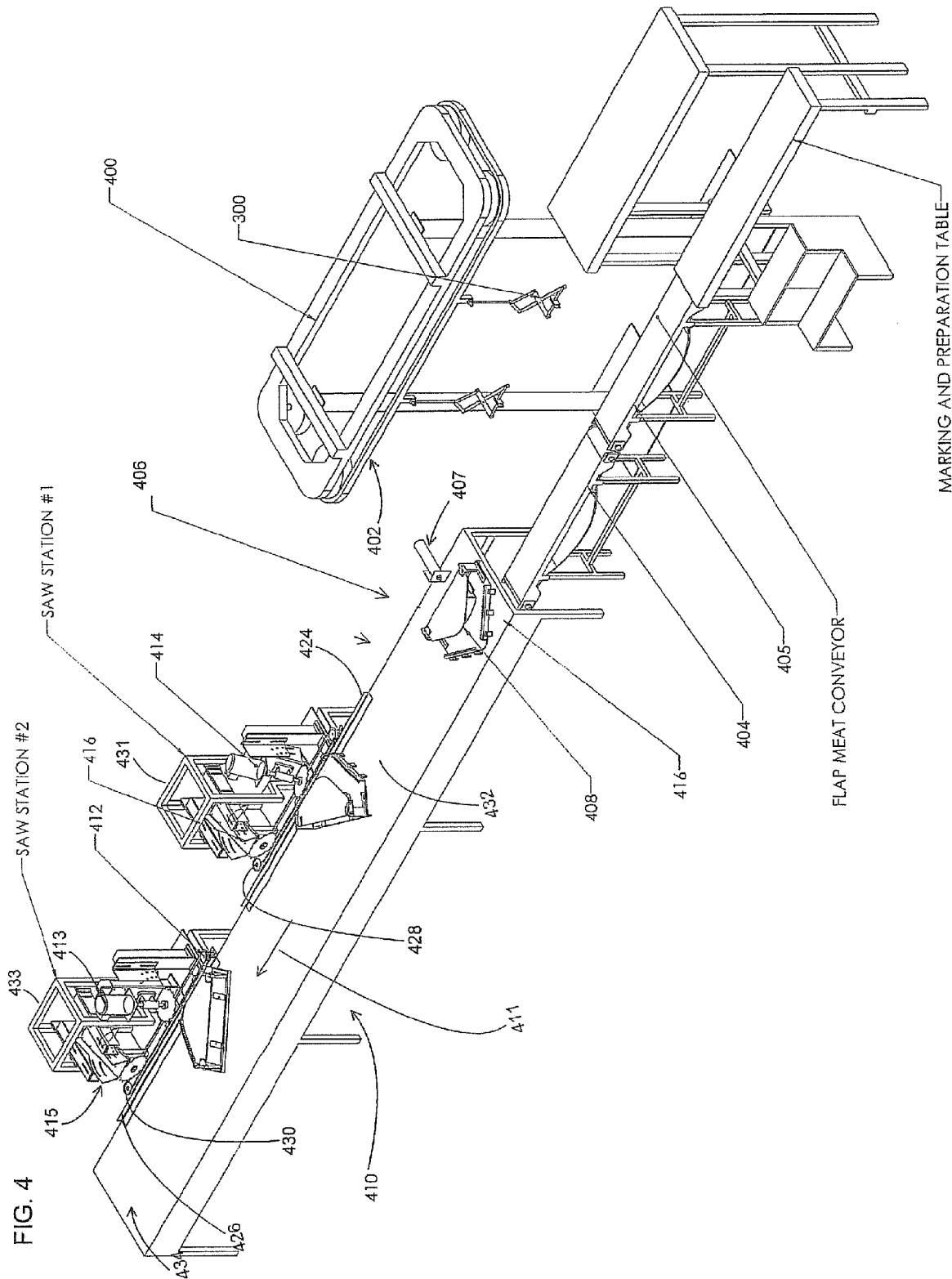

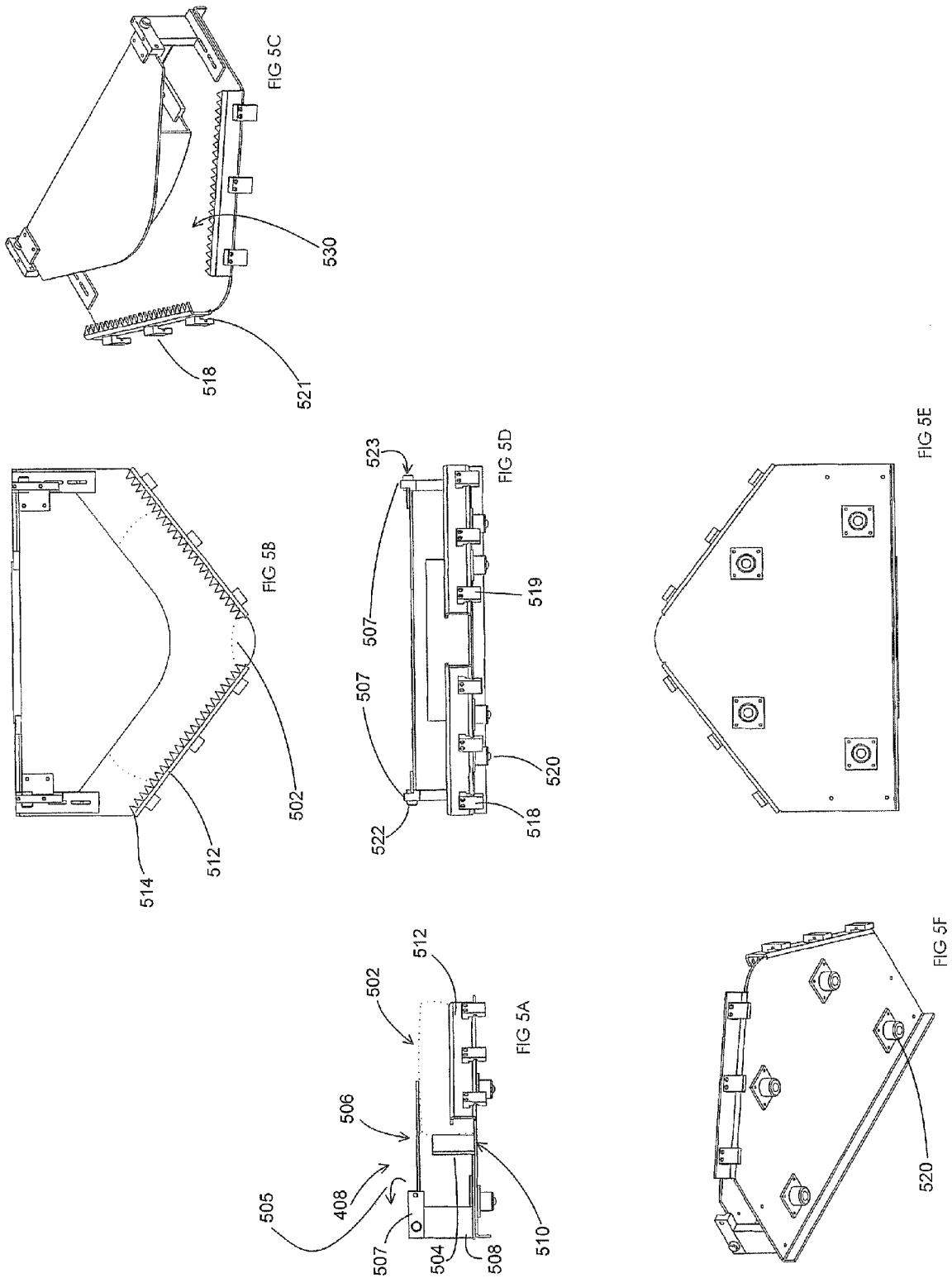

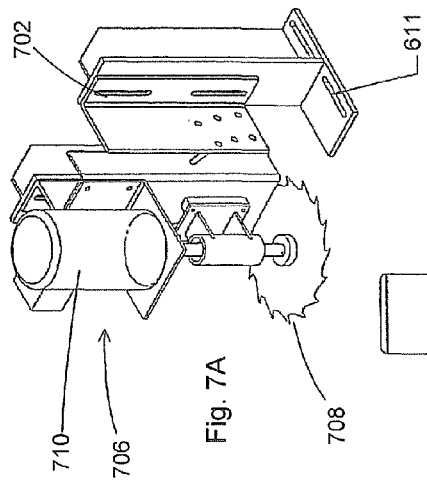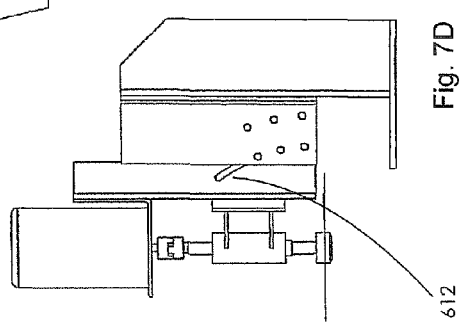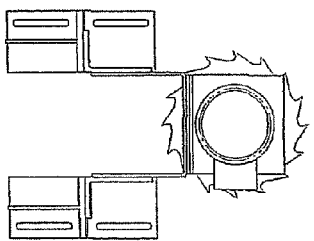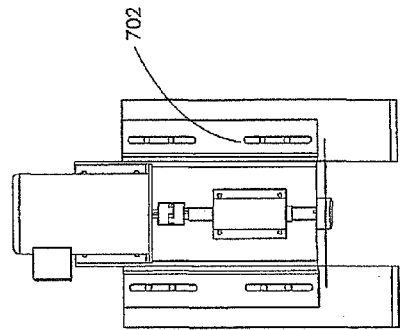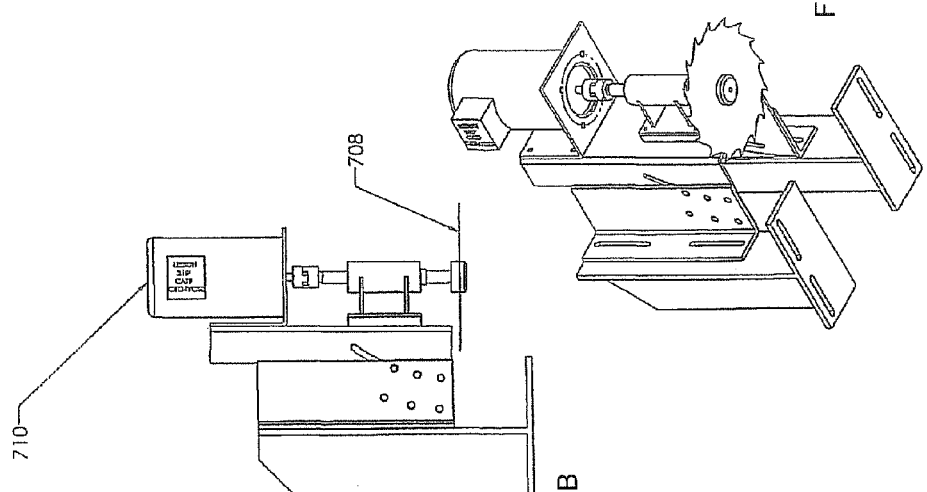

CHUCK LINE PROCESS FLOW SECTION 3 – THE SAW

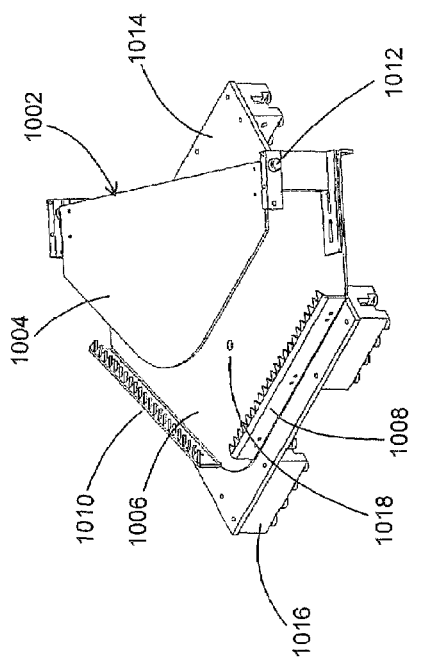
Fig. 10A
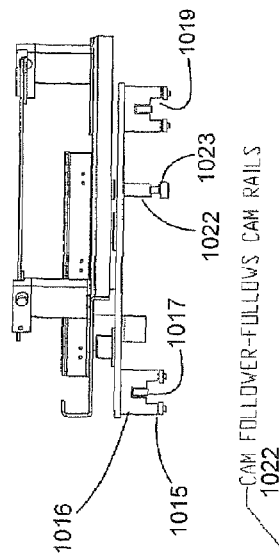
Fig. 10E
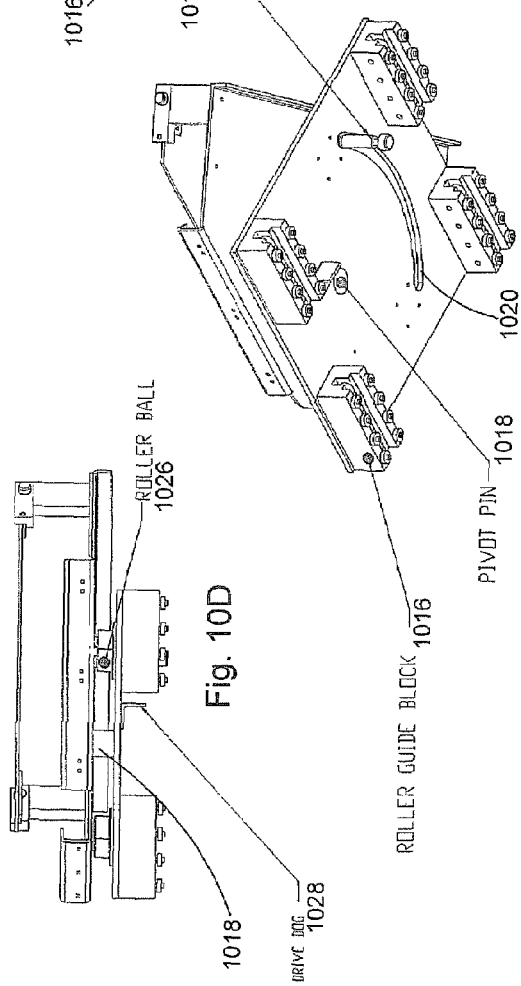
Fig. 10B
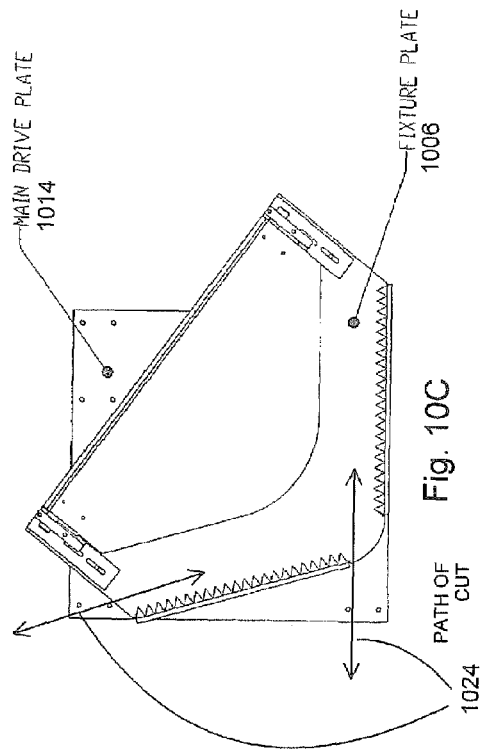
Fig. 10C
Fig. 10D

METHOD AND APPARATUS TO LOAD AND REMOVE BONES FROM PRIMALS

BACKGROUND OF INVENTION

1. Field of Invention

This invention relates generally to processing primal and sub-primal cuts of meat and, more particularly, to removing bones from primal and sub-primal cuts of meat.

2. Background Art

During the disassembly and processing of an animal carcass such as a beef carcass in preparation for delivery of meat products to market, the head is typically removed and the carcass is cut in half lengthwise along the spinal canal. Disassembly of the animal carcass may differ dependent on the type of animal and the protein product being processed. However, in the case of the beef carcass, after cutting the carcass in half, the carcass is then typically divided into its primal meat cut portions such as the "chuck primal cut". The chuck primal cut of meat is from the head end of the halved carcass and includes the neck, arm bone and shoulder and a portion of the fifth through first rib. A sub-primal cut is a large section of the primal cut. For example, the chuck blade sub-primal cut is a portion of the chuck primal cut. The chuck blade sub-primal cut meat portion includes the neck and shoulder portion and a few inches of the rib.

The removal of bones from primary and sub-primal cuts of meat is very difficult and manually intensive operation. Many primal and sub-primal cuts of meat have a large number of bones of various sizes, shapes and contours that form a complex skeletal structure of the meat cut. For example, the chuck blade has the rib bone skeletal structure and the neck bone skeletal structure. Removing of bones from a sub-primal meat cut is very difficult because of the complex skeletal structure. Also primal and sub-primal cuts of meat particularly from a beef carcass can weigh more than 75 pounds and can have varying sizes, shapes and contours that make it difficult to manually manipulate the meat portion.

A large portion of the disassembly of the meat and removal of bones is performed by utilizing powered cutting tools or hand held knives. Also, some portions of a given primal or sub-primal cut of meat may have bones that have contours that vary considerably with respect to each other which requires the use of a hand held knife that has a flexible blade. Each type of animal carcass and the portion of the carcass being processed, whether it is beef, pork, poultry, mutton, fowl, or similar animal, pose its own unique challenge with regard to bone removal.

For example, the chuck blade is a sub-primal cut of meat and bone that is taken from the front of the beef carcass and presents a difficult and manually intensive operation for removing the bones because of the different types of bone structure and the varying contours of each bone. The chuck blade sub-primal cut can weigh up to 90 pounds and is approximately 24 inches by 18 inches by 8 inches. The final products produced from the chuck blade vary greatly but are predominantly boneless. Typically, the meat of the chuck blade needs to be separated from the bones in one piece with minimal damage to the meat, especially the muscles that are to become the chuck roll. Requiring the meat to be separated from the bone structure in one piece also requires a cutting tool and process that is adapted to follow the varying contours of the bone structure without destroying the meat.

During typical processing of a chuck blade, the person removing the bones must remove the back strap tendon (Ligamenum nuchae), the atlas bone and the rope meat (longus colli). The mock tender (supraspinatus) can be left attached or can be detached from the rest of the muscles depending on the product being made. The process of manually removing the bones from the chuck blade involves manually manipulating the sub primal cut into several orientations so that the bones of the meat portion can be readily accessed. The size and weight and shape of the sub-primal cuts make this manual process very difficult. The bones are typically removed from the chuck blade utilizing a very flexible hand held knife. The individual performing the bone removal process (simply referred to as "de-boning") manipulates the knife in and around the many various contours of each vertebra.

The large number of bones with the various contours makes this process both difficult and time consuming. The neck vertebrae can be the most difficult in the entire cutting process because each vertebra contains many varying contours. The multiple manipulations of the of the knife performed by the operator in order to follow the various contours of the bone can lead to wrist and arm strains to the arm and wrist utilized to manipulate the knife. In addition, the featherbones channel, and knuckles of the rib bone and thoracic vertebrae skeletal structure all present their own challenges because of their varying shapes, sizes and contours. Navigating a knife in and around these various bone groups results in a wide range of motion and manipulation of the knife and requires a wide range of force to be applied to the knife to navigate through each of these areas which again makes fatigue and injuries to the wrist and arm vary common.

Staffing the chuck blade de-boning position is also challenging because it is difficult to find an individual who is willing and able to withstand the strain imposed on the wrist and arm. The complexity of the bones and the amount of effort required to remove the bones makes the chuck blade de-boning position (chuck de-boning) one of the most difficult staffing challenges in a packing house. The training period is longer than the training period for any other position. Also, many of the people who start the training process for the position move to another position before becoming qualified as a chuck de-boner because of the high level of difficulty. It is the difficulty of the chuck blade de-boning process that is the motivation behind the present invention, however, the present invention can be utilized on various carcass types and portions. Removing bones from beef primals, specifically the chuck, is labor intensive and is the regulating task for the operations of the processing floor. The task is demanding and training along with retention of skill labor has challenged the beef industry for decades.

Several other processes and equipment have been developed or tested over the last decade. One invention is compliant boning, a method in which tension in placed on the bone and opposite tension on the meat. As the opposing forces pull, a manual operation of using a knife cutting the meat from the bone completes the task. This method is quite slow, dangerous, produces poor yields and is logistically impossible to implement in a modern processing facility.

The second effort attempted was to utilize reciprocating chisels to remove the meat from the bones and the concept was tested, producing some results that had limitations. The structure of the reciprocating chisels would not allow the meat to be separated from the bone and left a significant amount of yield, compared to standard hand boning methods. There is a semi automated saw that has two blades at an angle to each other to cut a section of the bone out of the primal.

BRIEF SUMMARY OF INVENTION

The invention is an automated apparatus and method for removing bones from primal and sub-primal cuts of meat where one embodiment of the invention is specifically adapted to remove the bones from the chuck blade portion of meat or other similar meat cuts. The invention is to provide a means and fixture which will eliminate the need for manually lifting the primal cuts while securely clamping the primal into a device which will function as the transporter and alignment device for bone removal.

The first stage is the marking and preparation of the chuck. The blade portion of the chuck sub-primal will be separated from the arm and foreshank portion by a band saw. After separation, the blade portion will be deposited onto one conveyor and the arm and foreshank will be deposited onto a separate conveyor. The blade will then have the apple bone, atlas bone and rope meat (Longus Colli) removed via manual straight knife. An operator can make a scribe cut in the thin skin. They can make this cut along the outer edge of the chuck cutting between the fat cap and the lean to allow a place to secure a scissors hook.

The second stage is the chuck cap mock tender (Supraspinatus), and flap meat (Obliquus Abdominis Internus) removal. A mechanical means for attaching the product can be a scissors hook suspended from an overhead chain rail or conveyor which will be used to assist in these operations. The operator making the scribe cut in the cap will attach a scissor hook to that portion. As the chain rail indexes or conveys forward, the chuck blade will slide down a pan and hang suspended by the scissor hook and the cap. The cap portion can be lifted and attached to the scissor hook and the entire meat cut can be suspended from the scissor hook. A knife can be utilized to sever the cap portion from the lean as the weight of the hanging lean portion assists in the separation. An operator can begin to separate the chuck cap until they reach a point where the tail of the mock tender becomes exposed at which time they will remove the mock tender. The mock tender can be put onto a conveyor that will then move it to an upgrade table. Next they can remove the flap meat and put that on the ground beef conveyor. Once these items are removed, they can finish separating the chuck cap from the lean. All of these operations can be performed manually with a knife. The lean portion will drop onto a conveyor below and the cap will remain suspended and index to a point where it can be released. This second stage can be used on other sub-primals as well where portions of the sub-primal are to be removed.

The chuck can continue on the conveyor until it reaches the load station. An operator can manually slide the chuck into the holding fixture orientating it so that the vertical side of the bone is facing the teeth of the fixture. A top compression plate will be ratcheted down until it is in a horizontal position relative to a bottom plate and at a fixed height. A cylinder or some other mechanical means can be activated, applying pressure to the compression slide which ratchets forward and begins to compress and form the chuck. As the meat compresses, it expands upward, pushing against the top plate and sliding forward toward the side rails and teeth of the fixture compressing it into a fixed angle and height. Once the product is compressed against the top plate and side rails sufficiently to hold the product in the proper position during cutting, the chuck is now completely fixtured and ready to be run through the sawing operation.

The fixture is capable of rotating 360 degrees in the horizontal plane. Each fixture can include a base plate which can act as a conveyer for lateral movement so that the fixture can be conveyed in parallel to the cutting saw fixtures. The base plates can be attached to a drive chain which allows the plate to be pulled and control the speed at which the product travels.

The blade angles and depths of the saws at the cutting stations can be specifically orientated with respect to each other to remove either the thoracic or cervical portion of the vertebrae. Also to the cutting station for these saws can have alignment fixturing to align the saws in the vertical and horizontal planes. This alignment method could be but not limited to a laser line, shadow box, ultra sound, etc. and can protrude down onto the chuck allowing the operator to use the exposed spinal channel, or other anatomical landmark, and the laser line to move the saws in and out horizontally into the correct position. The operator will also have the ability to raise and lower the saws vertically to adjust for any height variation in the chucks. This adjustability allows for consistency in the location and depth of the cuts regardless of the size of the chuck. Next they will slide the fixture further down the rail until it is at a position where the drive links can catch the drive dogs and drive the chuck through the saws. Whether the saws are set up to remove the thoracic or the cervical vertebrae, the majority of that specific portion of the bone will be removed by the saws.

The second set of saws operate the same as the first set, but the blade angles and depths are specifically set up to remove the portion of the bone that the first set of saws did not cut. For example, if saw station one was set to remove the thoracic portion, then the second set would be set to remove the cervical portion. After the fixture releases from the guide rail of the first set of saws, an operator or other mechanical means will rotate the fixture and align for the second sawing process. This set of saws will also utilize the same alignment method as the first sawing fixture. This fixture will also have adjustability components in the horizontal and vertical planes.

To remove the chuck from the fixture, the ratchet assemblies holding the compression slide forward and top plate down will be released. The slide and top plate can now be retracted from the compression position and the top plate can be capable of being flipped up allowing the chuck to easily be removed. The chuck will be removed from the fixture and conveyed to the upgrade table where the remaining bones and back strap tendon (Ligamenum Nuchae) will be removed by the use of a manual straight knife, a common meat hook, and/or a rotary knife.

The problems of exposure to risk factors associated with cumulative trauma disorders are addressed by this invention. Minimized and eliminated risks can also be resolved by the development and installation of this invention. Along with an improved environment for individuals, the production efficiencies will be improved both on labor utilization and product throughput.

Yields can be reduced compared to manual removal of the meat from the bone. Processing speeds (throughput) can be reduced. Little to no improvement to workers' exposure to risks was noted. No adjustability of the saw machine is provided. Pacing the process by utilizing several stations or modules that can be added for increased throughput. Maximizing yields and eliminating individuals' risk factors associated with cumulative trauma disorders is an advantage of the present invention. The present invention reduce labor. Securing the primal in a rigid and fixed state throughout the process These and other advantageous features of the present invention will be in part apparent and in part pointed out herein below.

BRIEF DESCRIPTION OF THE DRAWINGS

For a better understanding of the present invention, reference may be made to the accompanying drawings in which:

FIG. 4, is an illustration of a conveyance system;

FIGS. 5A-5L are illustrations of a meat cut holding fixture;

FIGS. 7A-7L illustrate the horizontal and angled cutting means;

FIGS. 10A-10G an illustration of an alternative holding fixture and conveyor.

DETAILED DESCRIPTION OF INVENTION

Figure 1:
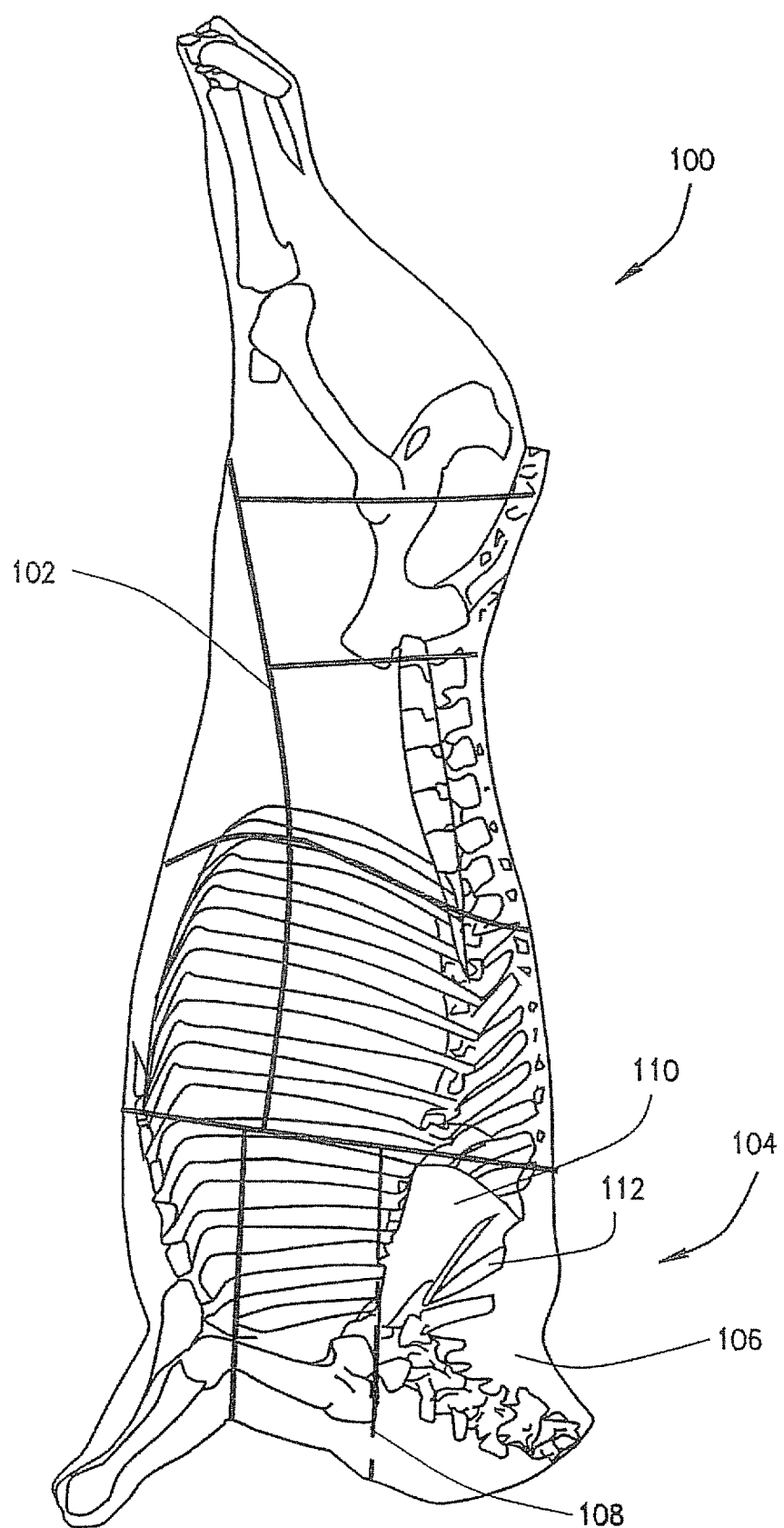
FIG. 1 is a half carcass.

According to the embodiment(s) of the present invention, various views are illustrated in FIG. 1-6 and like reference numerals are being used consistently throughout to refer to like and corresponding parts of the invention for all of the various views and figures of the drawing. Also, please note that the first digit(s) of the reference number for a given item or part of the invention should correspond to the Fig. number in which the item or part is first identified.

One embodiment of the present invention comprising a conveyance and cutting means teaches a novel apparatus and method for removing a bone structure from a sub-primal or primal meat cut.

The details of the invention and various embodiments can be better understood by referring to the figures of the drawing. Referring to FIG. 1, a side view of a beef carcass skeletal structure 100 is shown that reveals the primal meat cuts or primal meat cut portions of the beef carcass. A bold line 102 is shown that divides the beef carcass into the primal meat portions. When providing the detailed description of the various embodiments of the invention, the work item for which the discussion will focus is the chuck primal cut 104. More specifically, the work item for which the discussion will focus is the chuck blade sub-primal cut 106 which is the sub-primal cut above segmented dividing line 108.

Figure 2:
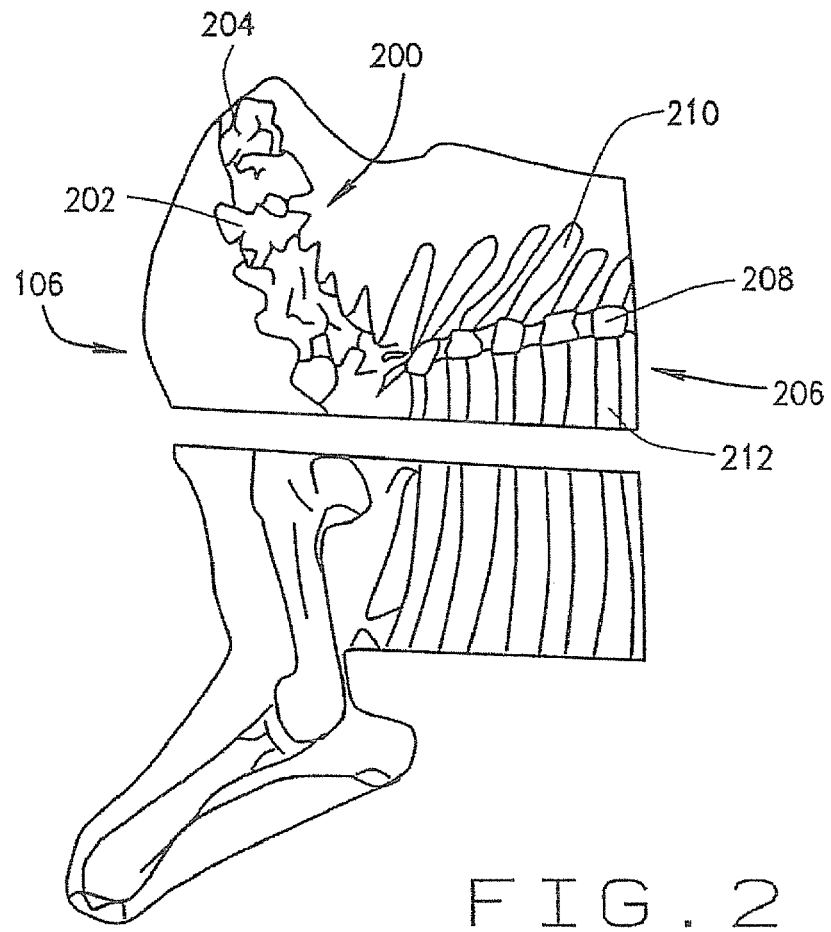
FIG. 2 is an illustration of primal and sub-primal cuts.

For the purpose of this discussion, it is assumed that the blade bone 110 (scapula) is already removed and that the five feather bones 112 can optionally be removed. Referring to FIG. 2, the chuck blade sub-primal cut 106 is shown. The skeletal bone structure of the chuck blade sub-primal cut can be divided into two major categories. The first category is the neck bone skeletal structure 200 which comprises the six neck bone cervical vertebrae 202 and the atlas bone cervical vertebra 204. The second skeletal structure category is the rib bone skeletal structure 206 (also referred to as blade bone skeletal structure) which comprises the first five rib (thoracic) vertebrae 208 with the feather bones (spinal processes) 210, and as much as the first few inches of the first five rib bones 212. It should be further noted that the vertebrae are in fact only half bone structures as the carcass during processing has been split in half along the length of the spinal canal. The sub-primal cut of meat also includes the attached muscles or meat including muscles that are commonly referred to as the chuck roll. The meat to be removed also includes the back strap tendon (ligamentum nuchae), the rope meat (longus colli), the flap meat (Obliquus Abdominis Internus), and the mock tender (supraspinatus).

It can be readily established upon examination of FIGS. 1 and 2 that there are complex skeletal structures within the chuck blade sub-primal cut and that each of the unique portions of the skeletal structure have different and distinct contours and protrusions which will make removal of meat from this sub-primal cut extremely difficult. However, to facilitate the handling of removal of the meat from the bone structure, the chuck blade sub-primal cut skeletal structure has been divided into two categories based on the two categories of the skeletal structure outlined above. It was decided to divide the sub-primal cut into these two major skeletal structures because the contours, although varying, are similar within each of the two categories. Therefore, the method and apparatus for separating the meat from the bone structure within a given skeletal structure category can be the same.

Figure 2A:
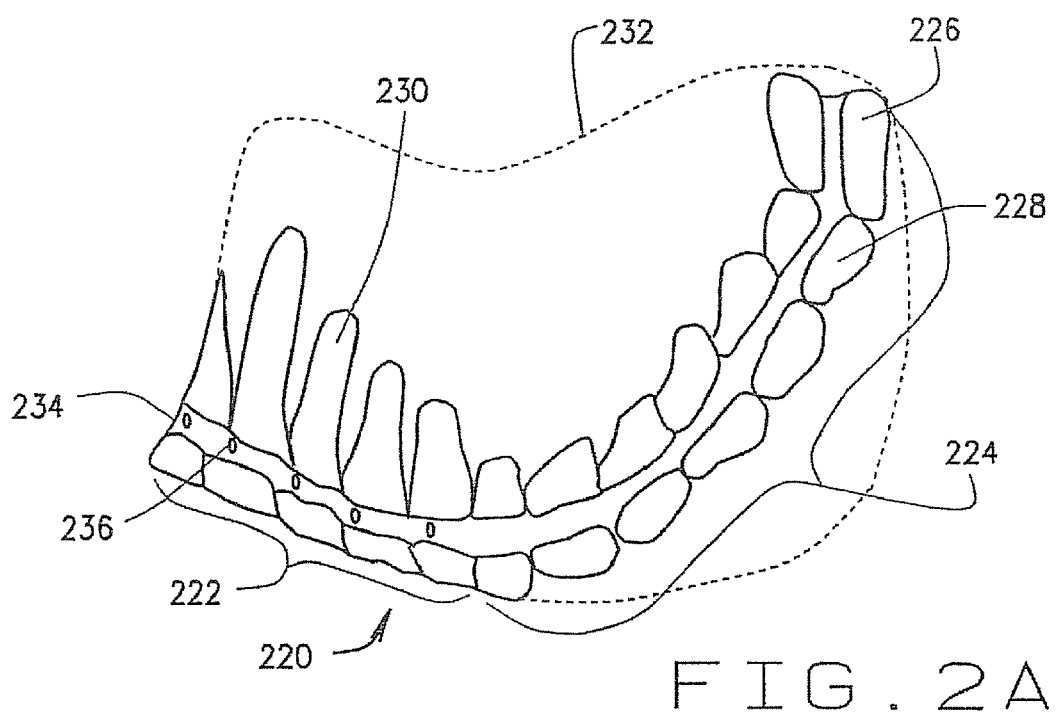
FIGS. 2A-2C are illustrations of a chuck blade.
Figure 2B:
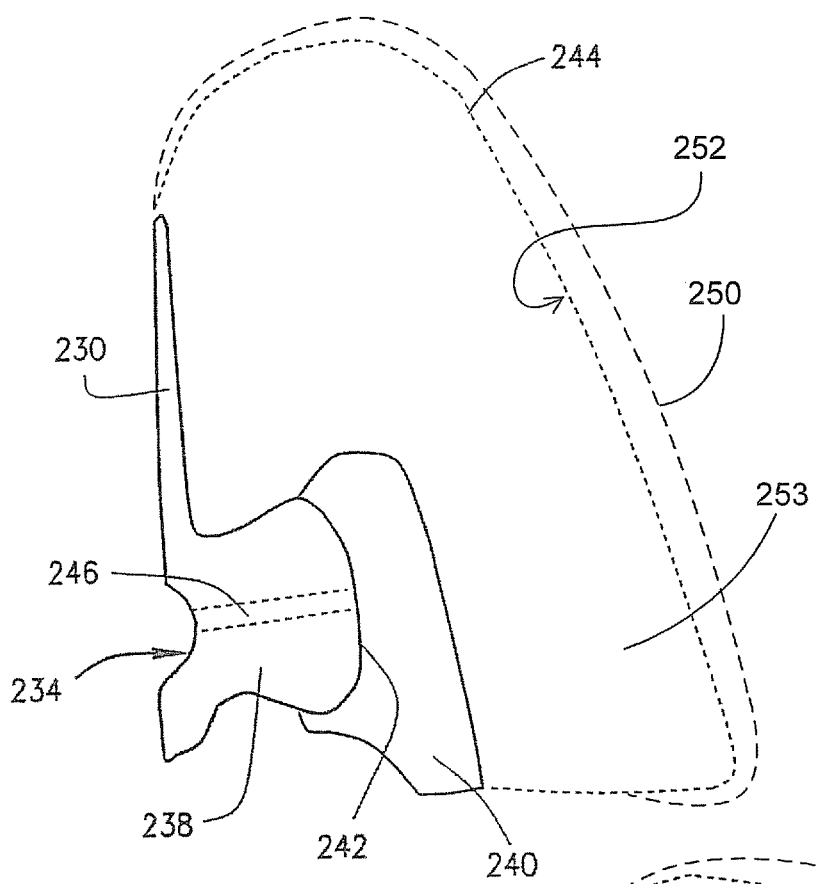
Figure 2C:
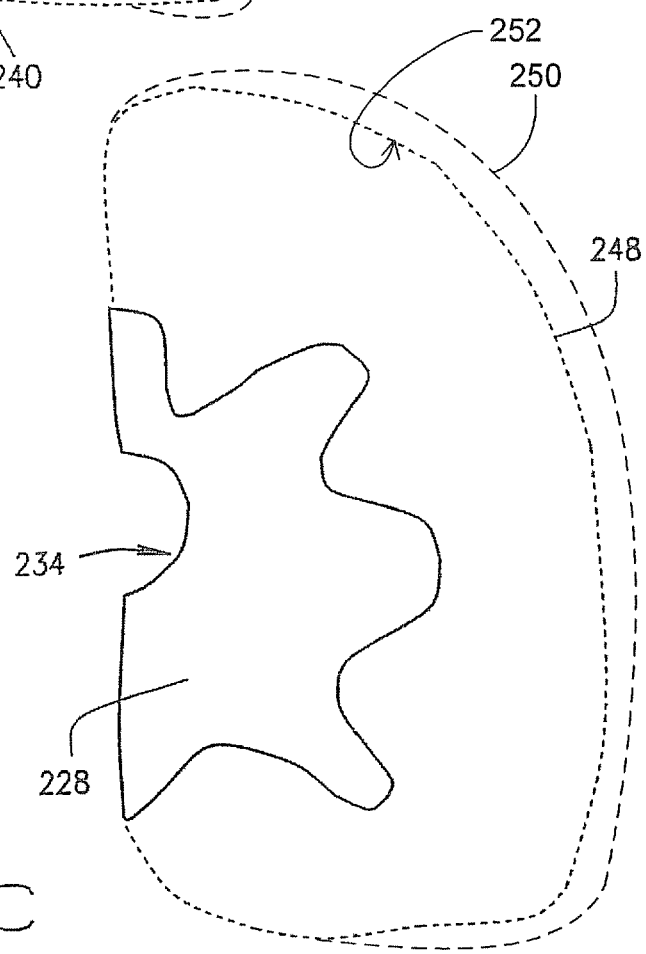

Referring to FIGS. 2A and 2B and 2C, the boneless structure of the chuck blade sub-primal meat cut is shown with the meat portions removed. However, the outline of the meat is reflected by a segmented line. Referring first to FIG. 2A, a side view of the spinal canal side of the chuck blade bone structure is shown. The chuck blade bone structure 220 has a naturally arched profile due to the tendons and muscle within the chuck blade sub-primal meat cut. This naturally arched profile of the bone structure adds to the difficulty of the de-boning process. This problem is mitigated, however, by hanging the meat vertically on a mounting panel such that the weight of the meat and gravity tends to straighten the alignment of bones. Also, as meat is removed and starts to drape over and hang downward, the bone structure alignment is further straightened, thereby further facilitating removal of meat from the neck bone structure.

The chuck blade sub-primal meat cut bone structure can be separated into two categories. The first category is the thoracic vertebrae 222 which is made up of five thoracic vertebra or rib vertebra. The second category is the cervical vertebrae 224, which comprises one atlas bone 226 and five cervical vertebrae 228 or neck vertebrae. There are also 5 feather bones 230 joined to the five rib vertebrae. The outline of the meat is reflected by segmented line 232. The spinal canal 234 is also shown which is defined by the series of connected vertebra as the spinal canal extends through each vertebra. There are five openings 236 in the wall of the spinal canal that opens to a channel that extends through each of the thoracic vertebra. This opening and channel allows nerves to extend from the spinal canal through the channel and out through to the various body components of the animal. This opening and channel are utilized to mount the chuck blade sub-primal meat cut on a mounting panel. This procedure will be described further below. The two categories of bone structures, the thoracic and the cervical, can be readily discerned upon examination of the bone structure anatomy. Once the categories have been determined, the cutting means or the de-boning means can be determined for a given category of bone structure.

Referring now to FIGS. 2B and 2C, radial cross sections of a thoracic vertebra and a cervical vertebra are shown respectively. FIG. 2B, which shows the radial cross section of a thoracic vertebra, further shows the feather bone 230, the spinal canal 234, a thoracic vertebra 238 and a rib bone 240. The joint between the thoracic vertebra 238 and the rib bone 240 is commonly referred to as the knuckle 242. The outline of the meat is shown by segmented line 244. The channel 246 that extends thorough the thoracic vertebra is the channel mentioned above which has opening 236. Again, channel 246 provides a pathway for nerves to extend from the spinal canal through the channel 246 and on to the various body parts of the animal. Also, when examining the thoracic vertebra and rib bone anatomy it is readily determined that the anatomy of the rib bone structure has a substantially flat anatomy. It is also noticed that the exterior contours of the bone structure are relatively uniform and consistent in all five vertebrae. Examining and determining these features of the bone structure for a given meat cut will facilitate the categorization of the various bone structures and further determining the de-boning means that will be utilized to optimally de-bone the meat cut.

Referring to FIG. 2C, a radial cross section of a neck vertebra 228 is shown. The spinal canal 234 is also shown. Also, the outline of the meat is shown by segmented line 248. It can be determined upon examining the neck vertebra that the contours of the bone anatomy are relatively nonuniform and inconsistent, particularly from one neck vertebra to the next. It also can be determined upon examination that the bone structure anatomy has a more rounded anatomy as opposed to a relatively flat anatomy. The determination of the contours of the anatomy of a bone structure assist in determining the de-boning means utilized to de-bone this portion of the chuck blade sub-primal meat cut.

The chuck blade sub-primal cut can include a chuck fat cap portion 250, which can be removed prior to further processing of the chuck blade. The chuck fat cap portion 250 is separated from the main lean portion 253 of the chuck blade by a thin membrane as indicated by item number 252. It is along this membrane that the chuck fat cap portion can be separated from the main lean portion of the chuck blade.

Figure 3:
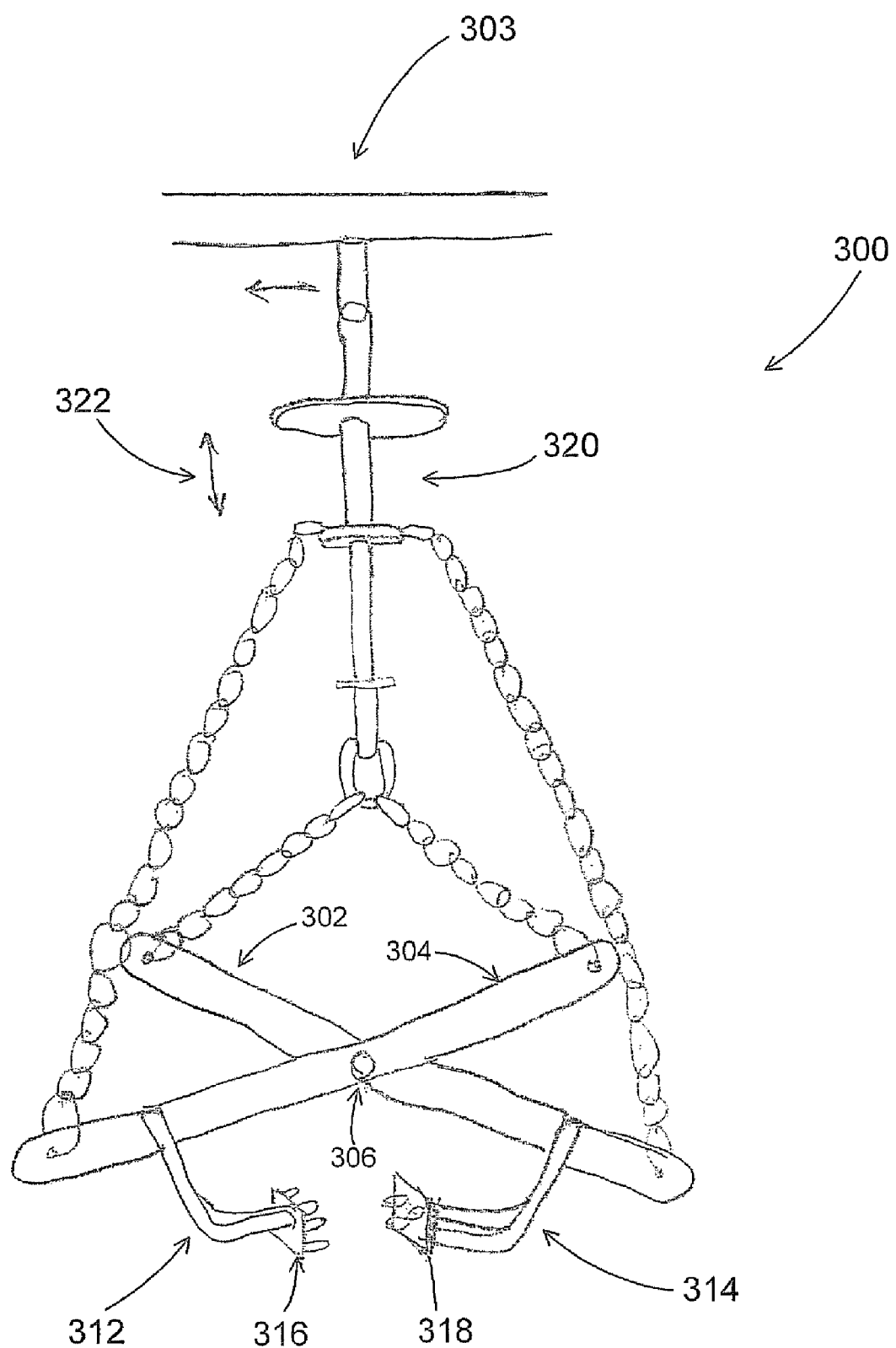
FIG. 3. is an illustration of a scissor hook.

However, prior to separating the chuck cap from the main lean portion, the sub-primal cut can first be attached to a mounting fixture or scissor hook, as shown in FIG. 3 that will hold the piece of meat during the process of separating the cap. One embodiment of the fixture described herein is also designed to take advantage of the weight of the sub-primal cut of meat by using gravity to assist in separating the chuck cap. The mounting fixture is designed to secure the meat in a vertical position in such a manner to allow the meat already severed from the bone to hang down and create a tension at the meat and membrane interface to facilitate the cutting process. Also, fixing the sub-primal cut in a vertical position should also assist in positioning the bones in a substantially straight line to facilitate separation of the chuck cap. The chuck blade is utilized in the description of the invention for illustration, however the same process and apparatus can be used for other sub-primals.

In order to attach and suspend the chuck blade from the scissor hook or mounting fixture, an initial incision can be made into one end of the chuck blade along the membrane line 252 between the chuck fat cap 250 and the main lean portion 253 of the chuck blade. When the incision is made a portion of the chuck cap along the incision is lifted and separated from the main lean portion such that the lifted cap portion can be attached to or clamped/pinched in the scissor hook such that the chuck blade is suspended therefrom. Once the chuck blade is lifted and suspended, an operator can utilize a straight knife to cut along the membrane thereby separating the chuck cap from the main lean set portion. The weight of the suspended chuck blade will assist in the separation of the chuck cap from the main lean portion.

Referring to FIG. 3, an illustration of a scissor hook 300 is shown. The scissor hook 300 has left and right scissor members 302 and 304 respectively. The left and right members are joined in a scissor-like manner at pivot point 306. The scissor hook can be hung from an overhead conveyor system 303. The scissor hook can have left and right clamping members 312 and 314 respectively where each clamping member has an engaging member 316 and 318 for engaging an item to be suspended therefrom. The engaging member can have dagger pins. During operation, the scissor hook can be expanded by lifting up on slide member 320 and then released as indicated by directional arrow 322 to slide up and down over a hanging rod attached to the conveyor 303 and extending through the slide member 320 in order to engage or clamp a lifted portion of a chuck fat cap with the engagement members. Once the chuck fat cap has been completely separated, utilizing the cutting means, from the main portion of the chuck blade, the chuck fat cap can be removed from the scissor hook and placed on a conveyor system separate from the conveyor on which the chuck blade falls when the severing occurs. The weight of the lean portion of the chuck blade assists the operator to sever the chuck fat cap from the chuck. FIG. 4 illustrates a conveyor system 400 having an overhead conveyor 402 such as an overhead conveyor belt on which a scissor hook 300 can be conveyed. Conveyor 404 will convey the chuck blade once it has been severed from the chuck blade cap. The chuck blade fat cap will be deposited on conveyor 405 for separate processing.

Figure 6D:
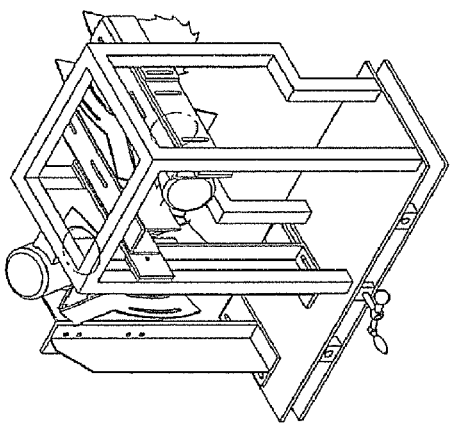
FIGS. 6A-6G are perspective and plan views of a cutting station.
Figure 6G:
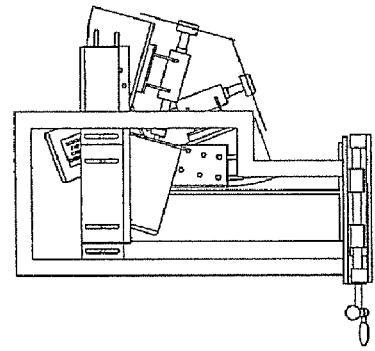
Figure 6C:
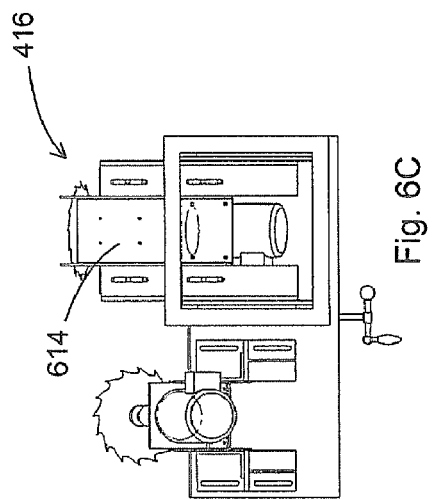
Figure 6F:
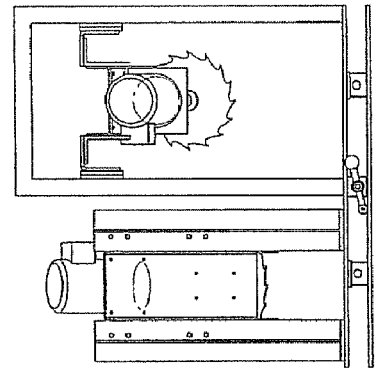
Figure 6A:
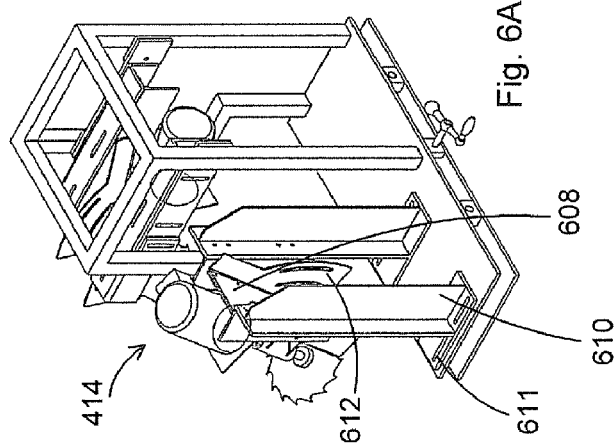
Figure 6E:
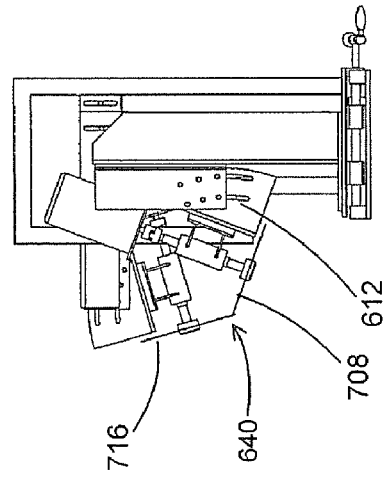
Figure 6B:
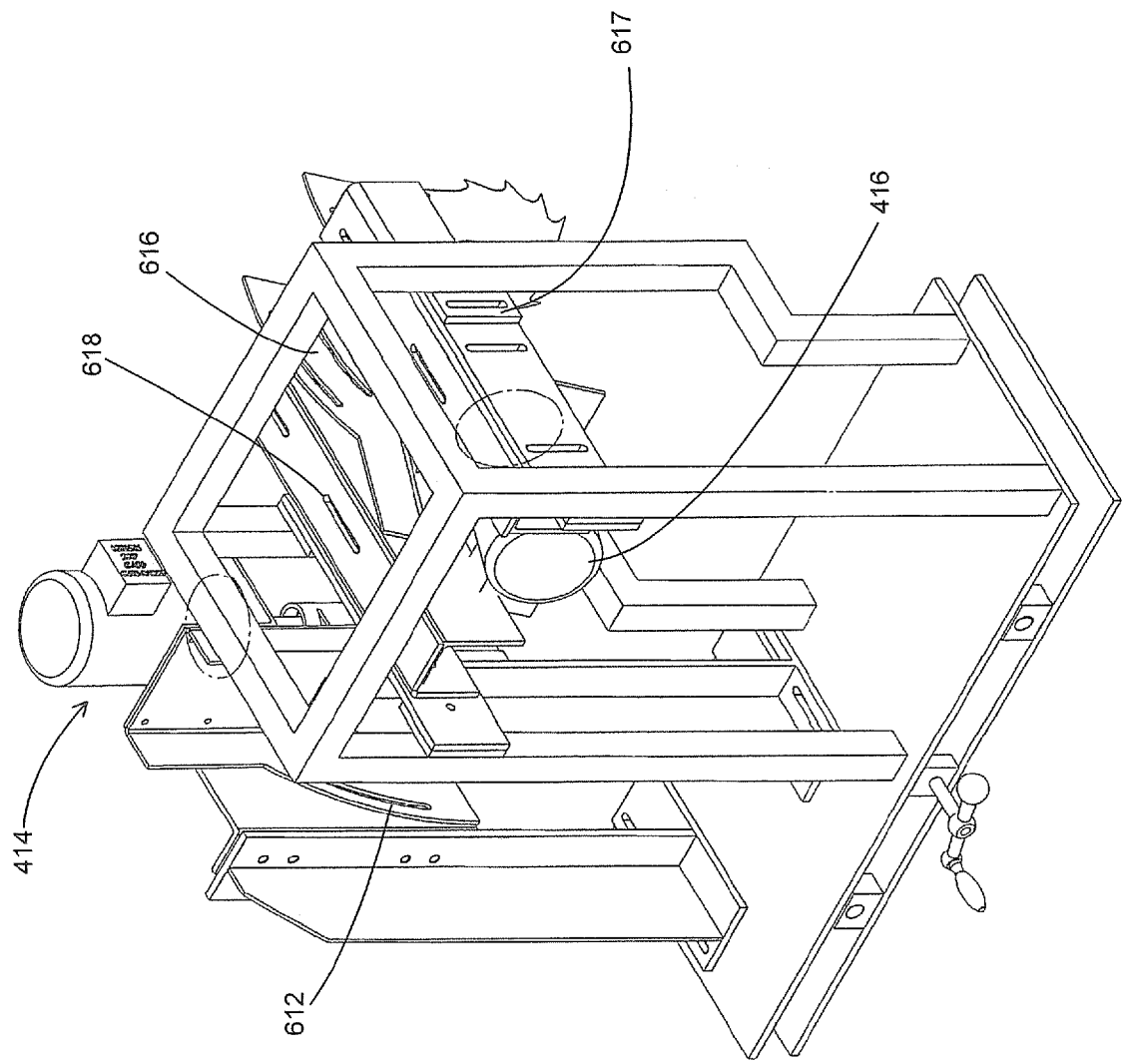
Figure 7H:
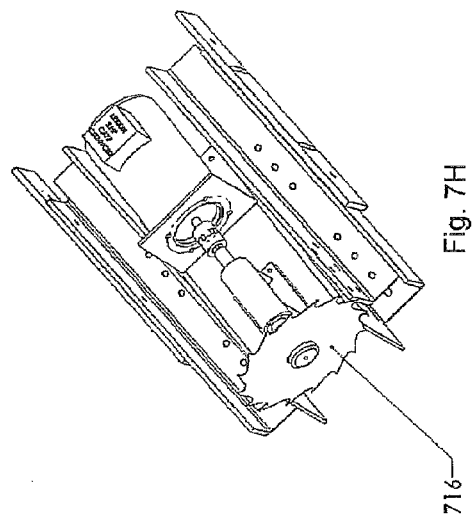
Figure 7K:
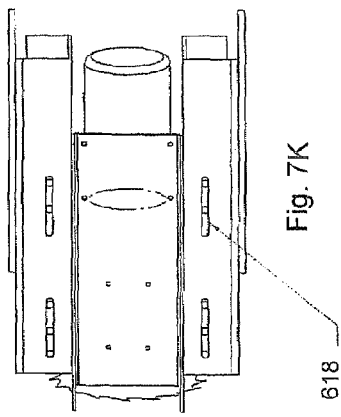
Figure 7I:
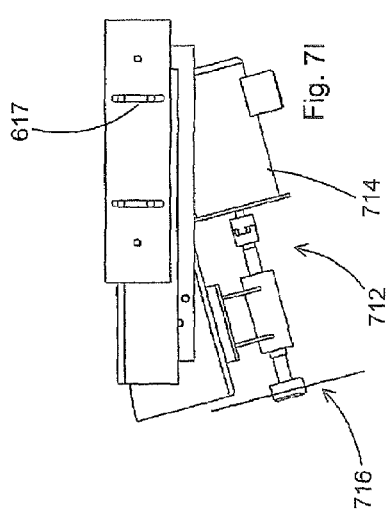
Figure 7L:
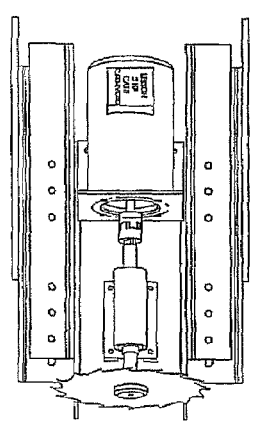
Figure 7G:
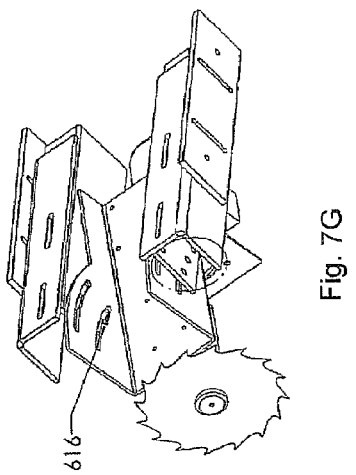
Figure 7J:
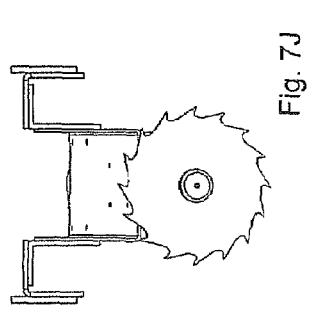

The conveyor and surrounding fixturing will be designed such that as the chuck blade falls it will flip over such that the bone side is down and the lean side up for the purpose of removing the flap meat. Once the flap meat is removed there can be a mechanical device which flips the product lean to bone leaving the bone side up. Having the bone side up will allow the operator to line tip the chuck blade with a saw apparatus using the exposed spinal channel as a visual alignment guide. An operator can now position the chuck blade onto a fixture that will hold the chuck blade in position while the bone is being removed. The chuck blade can be positioned and aligned with a sawing apparatus as shown in FIGS. 6A and 6B with the use of an alignment mechanism such as for example a mechanical alignment mechanism or a laser line and the spinal channel.

Referring to FIGS. 5A thru 5L, the fixturing or holding fixture for the sawing operations is shown. The chuck blade that is mounted on a holding fixture can be conveyed along a cutting path 411 to engage circular saws for removing the bone from the chuck blade. The sub-primal cut such as the chuck blade can be conveyed along conveyor 404 to a load station 406 for loading the sub-primal cut into a holding fixture 408. The load station 406 includes, but is not limited to, a compression air cylinder 407 operable to push against a compression slide plate of the holding fixture to thereby compress the sub-primal cut within the holding fixture. The holding fixture can then be transported to a cutting station 410 where the holding fixture is aligned and linked to a chain drive system 412 for aligning and conveying the holding fixture 408 such that the bone structure of the sub-primal cut can be aligned to be cut. The cutting station includes a first cutting saw 414 and a second cutting saw 416, a third cutting saw 413, and a fourth 415. The holding fixture can be aligned to track on guide rails 424 and 426, which extend along the cutting path adjacent the cutting stations. The holding fixture can be driven along the guide rails when the drive dogs of the holding fixture is drive by the chain drive. The holding fixture can engage the guide rails at a start position just prior the cutting station and disengage the guide rail at a downstream end position immediately after a cutting station.

FIGS. 5A-5L illustrate various views of the holding fixture with a meat cut 502 as shown in dashed lines captured within the holding fixture 408. The meat product is placed in the holding fixture by rotating upward the top compression plate 506 as indicated by arrow 505 and laying the meat product on the support plate 510 or bottom plate between the compression slide plate 504 and the anchor side bar 512. The top plate 506 can be reinstalled over top of the meat cut once in place where the top compression plate 506 can be ratcheted to the lowest possible position with a ratcheting mechanism generally 523 or rung of the fixture uprights 508 or containment brackets. The top plate 506 is equipped with side brackets 507 having plate pins 522 extending therefrom that interface with containment brackets 508 for holding the top plate securely over the meat cut as it is compressed and not allowing the top plate to rotate upward.

Figure 5I:
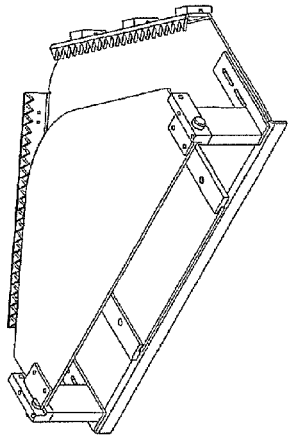
Figure 5L:
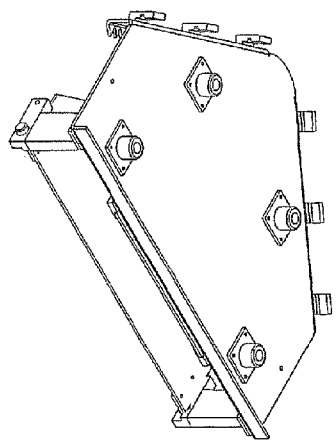
Figure 5H:
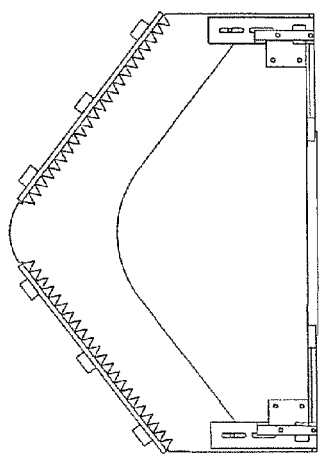
Figure 5J:
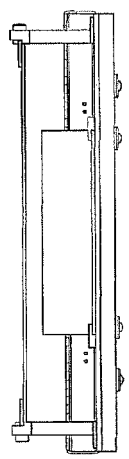
Figure 5K:
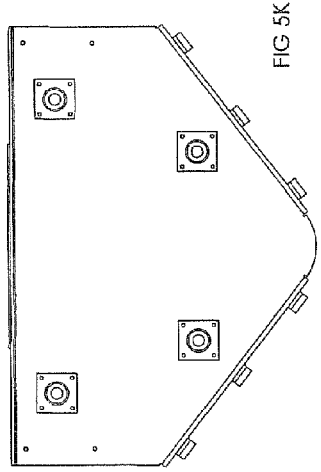
Figure 5G:
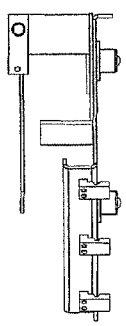
Figure 5P:
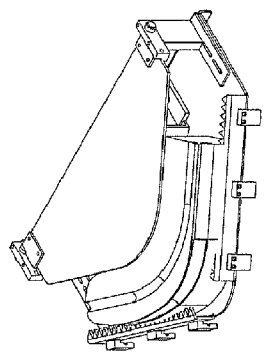
FIGS. 5M, 5N, 5P, 5Q, 5R, 5S, 5T and 5U are illustrations of a holding fixture with a meat cut mounted.
Figure 5S:
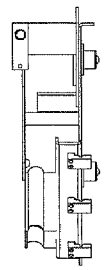
Figure 5N:
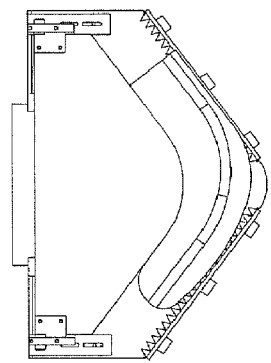
Figure 5R:
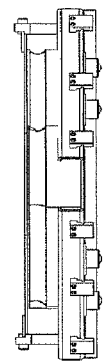
Figure 5U:
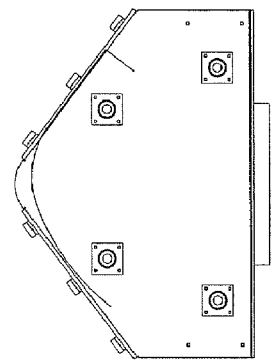
Figure 5M:
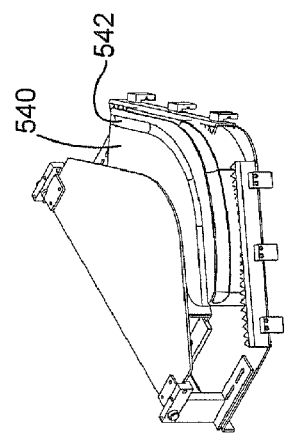
Figure 5Q:
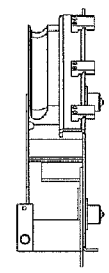
Figure 5T:
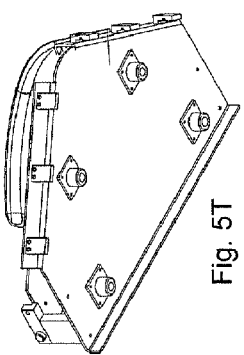

The compression slide plate 504 can be urged against the meat cut thereby forcing the meat cut against side rail anchor 512 and thereby causing the meat cut to compress and rise upward against the top plate 506. When the compression is sufficient to hold the top plate 506 fixed with respect to the fixture uprights or containment bracket 508 the position of the compression plate can be secured such that further movement does not occur. FIG. 5B shows a top plane view of the holding fixture where the outline of a meat product 502 is shown in broken lines compressed against the teeth 514 of the side rail anchor 512 by the compression slide 504. The support plate or bottom plate 510 has a rear end and a front end. The front end is wedge shaped having to frontal sides meeting at an apex forming a wedge. The side rail anchors are attached and extend along the frontal sides and stand perpendicular to the bottom plate. The slide plate is slidably attached to the support or bottom side and slides rear to front. Referring to FIG. 5C, the holding fixture has a plurality of drive dogs around its periphery for aligning the fixture with the cutting station. FIG. 5D is a front plan view of the holding fixture showing the right side drive dogs 518 and the roller ball members 520 that enable a user to roll the holding fixture containing the meat cut across a flat surface thereby conveying laterally to another location. Referring to FIGS. 5F and 5E, the roller balls are more clearly seen. The drive dogs can have an opening 521 for receiving an alignment rail. Therefore, dogs 518 will align the holding fixture in a different manner from dogs 519. FIGS. 5G-5L merely show additional views of the holding fixture.

The holding fixture can be rolled or transported to the cutting station. At the cutting station, the set of drive dogs 518 or 519 attached along the side of the holding fixture can be aligned on the track rail 424 or 426 as seen in FIG. 4 for aligning the holding fixture and can be captured by drive links on the conveyors 428 and 430. The alignment is obtained by interfacing the rail 424 or 426 with a set of the drive dogs 518 or 519 thereby creating an alignment track for conveying the holding fixture along the cutting plate.

The holding fixture 408 can be driven along the drive track by the drive links or hooks attached to the conveyor such that the meat cut engages the cutting station. Cutting station 410 includes first and second cutting stage frames 431 and 433 having mounted thereon first and second saw assemblies 414 and 416; or 413 and 415 respectively. Having first and second cutting stages is optional. The same can be accomplished with one stage, but would require back tracking to perform a second cut with the second set of dogs aligned. One cutting stage would likely also cause a longer set up and mounting time. The first and second stages and frames are substantially identical except for angles of saws.

The first saw assembly 414 is mounted on an adjustable mounting bracket 608 so that the angle of the saw cut can be adjusted. The mounting bracket 608 is further attached to a saw support bracket 610 which is also adjustable. The mounting bracket 608 has slotted mounts 612 which allow the angle of the blade to be adjusted as the mounting fixture is adjusted along the slotted mount. The saw support bracket 610 also has slotted mounts 611 so that the saw can be adjusted laterally. The second saw assembly 416 is also mounted on a mounting bracket 614 that also has mounting slots 616 for adjusting the saw assembly in order to adjust the angle of the cut.

FIGS. 5M-5U show the holding fixture with a meat cut 540 mounted within the holding fixture. The meat cut is shown compressed by the compression slide plate with the bone 542 exposed through the upper opening 530 between the top plate and the side rails.

Referring to FIG. 6B, another view of the cutting stage frame is shown. This mounting of the saw assembly can be adjusted in an angular manner, as well as vertically along slots 617, and as well as laterally along slots 618. The holding fixture is shown with the right side drive dogs engaged on the guide rail 426, see FIG. 4, and being driven to engage the saws the second of stage and the left side dogs engaged on rail 424 and being driven to engage the saws of the first stage. Given that some sub-primal meat cuts can have a curved bone structure such as for example the chuck blade multiple cuts may be required in this manner. This is the reason for the second set of drive dogs as shown. After the cut has been implemented utilizing the right side set of drive dogs, the holding fixture can be removed from the guide rail and disengaged from the conveyor drive where the other left set of drive dogs 519 can be engaged for performing a subsequent cut to remove the remainder of the bone structure. The holding fixture can be easily maneuvered at the cutting station due to the roller balls underneath. This holding fixture embodiment is optimal for a primal or sub-primal meat cut having a curved bone structure exposed on one side to be removed such as with the chuck blade. The wedge shaped front of the holding fixture is also important due to the curved bone structure because of the positioning caused by the two sets of drive dogs. The blade of saw assembly 414 is shown with the saw blade oriented to make a cut that is proximately horizontal and the blade of saw assembly 416 is shown with the saw blade oriented to make a saw cut that is proximately vertical.

Referring to FIG. 7A-7L, various views of first and second saw assemblies are shown. The height of the saw can be adjusted along mounting slot 702. The angle of the saw can be adjusted along mounting slot 612 and the saw can be adjusted laterally along mounting slot 611. The saw as shown is a circular saw 706 having a circular blade 708 driven by a drive motor 710. Similarly, the second saw assembly includes a circular saw 712 with a drive motor 714 and a circular blade 716. The saw can be adjusted in an angular manner along mounting slot 616 and can be adjusted in a vertical manner along adjustment slots 617 and can be adjusted laterally along adjustment slots 618. The adjustment to the first and second saws can be adjusted to optimally cut a given primal cut of meat such as the chuck blade. However, the saws can be adjusted to cut another type of primal cut. These ranges of adjustments can also be driven dynamically and automatically to adjust along the adjustment slots responsive to characteristics of a particular meat cut. The structure, outline, and geometry of the bone structure can be determined by an electronic mechanism such as a laser scanner or x-ray or the geometry can be determined by a mechanical mechanism. The saw positions and orientations can be adjusted automatically response to the bone structure determined.

Figure 8A:
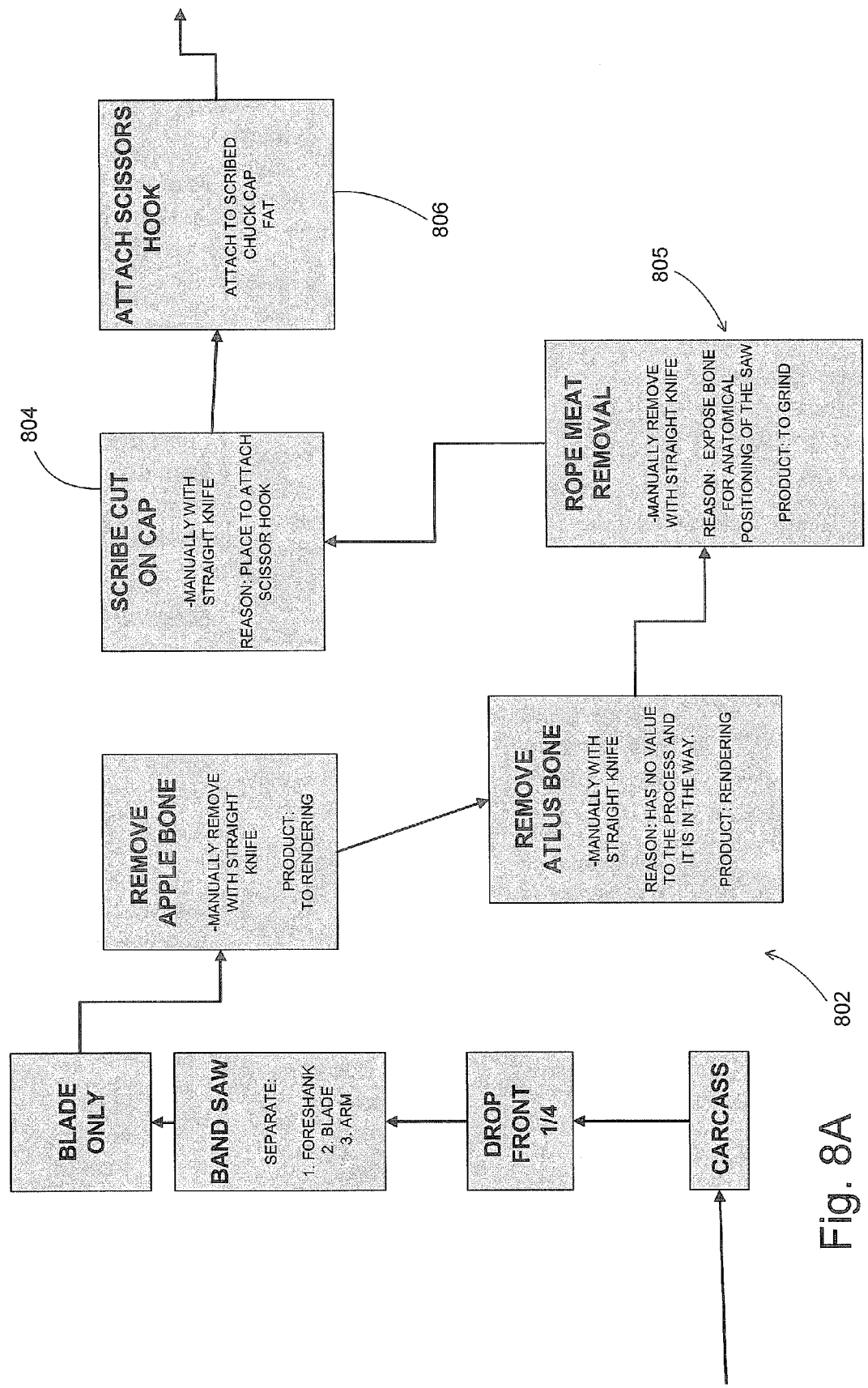
FIGS. 8A-8D are flow diagrams of a bone removal process.
Figure 8B:
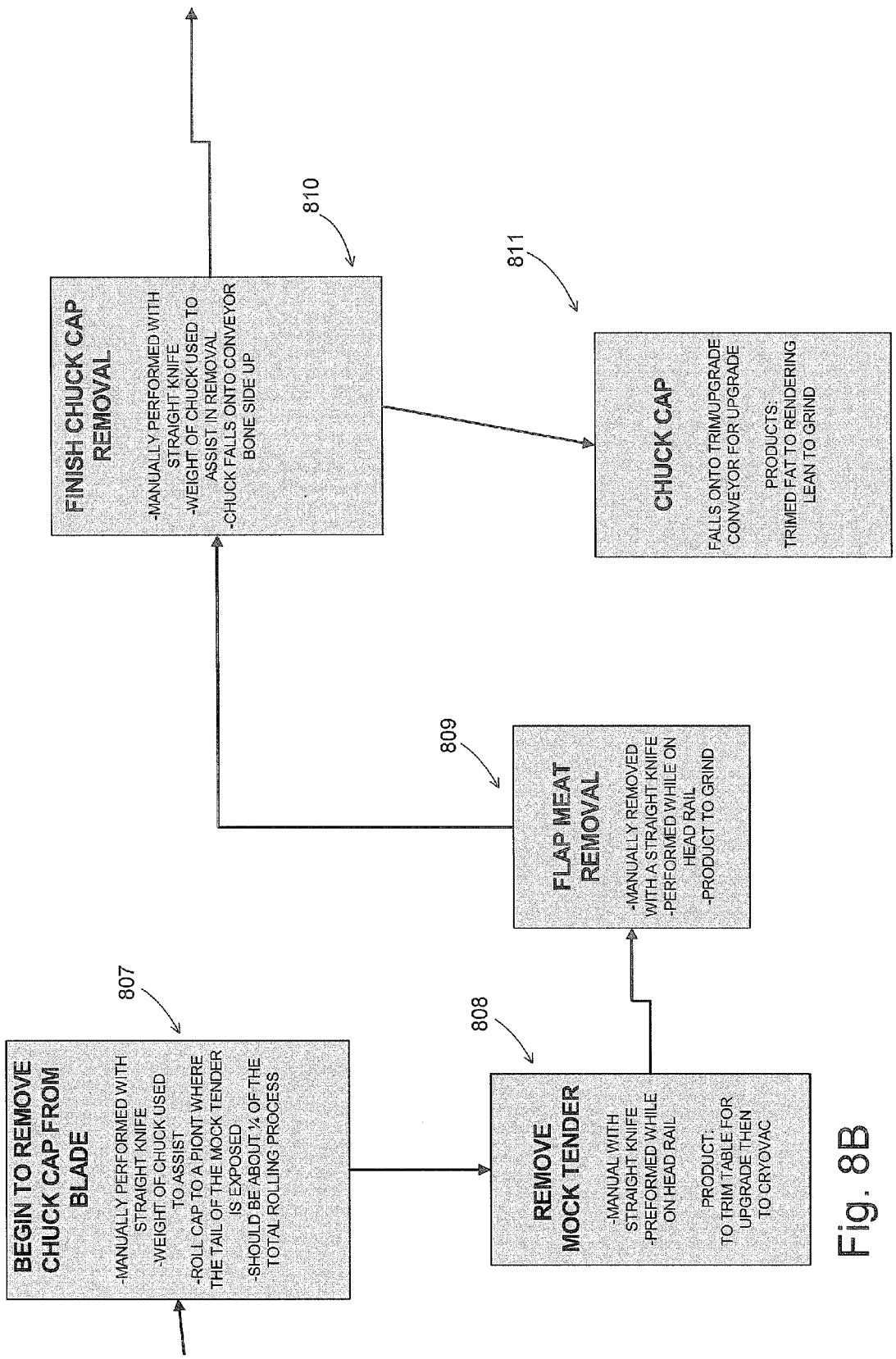
Figure 8C:
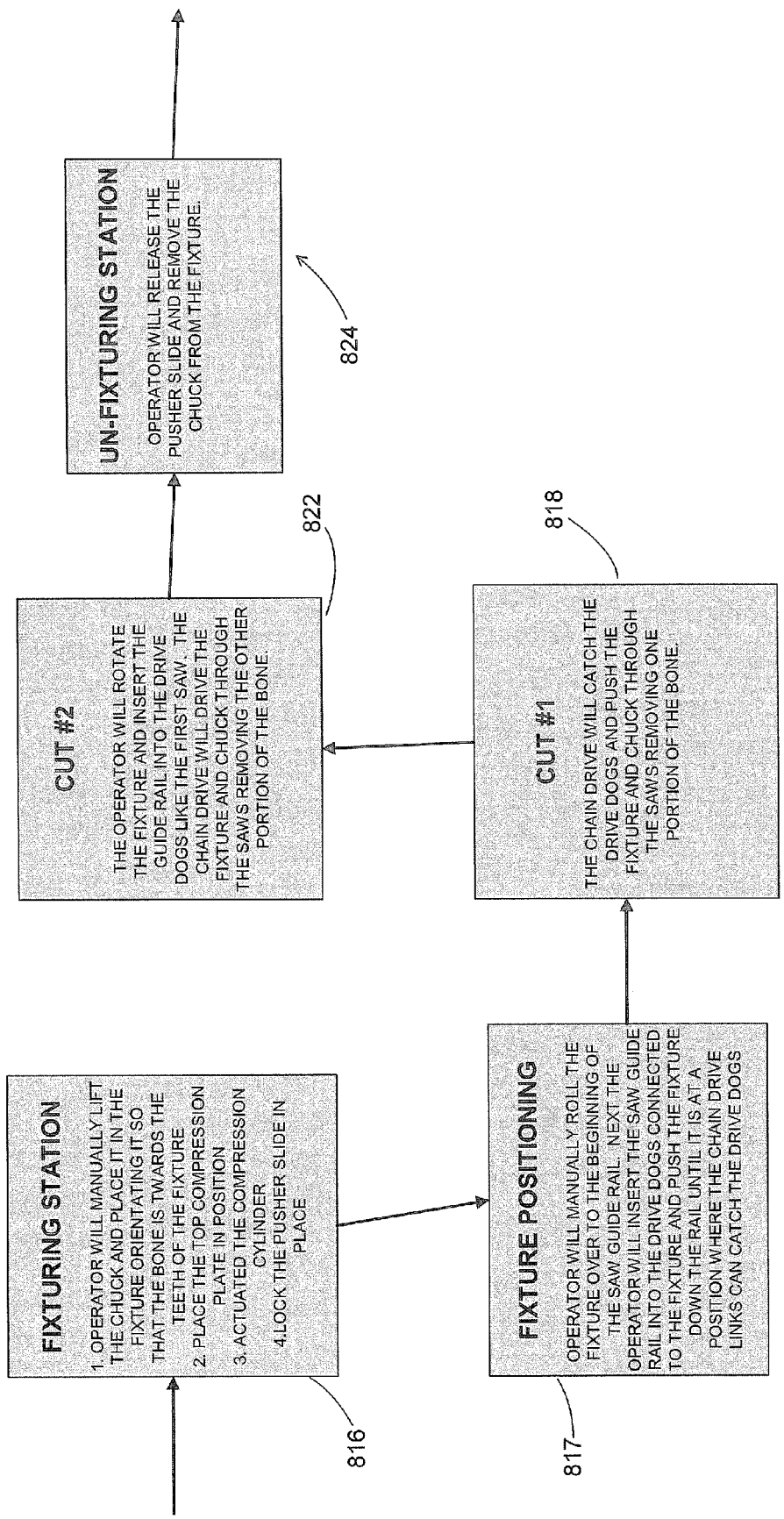
Figure 8D:
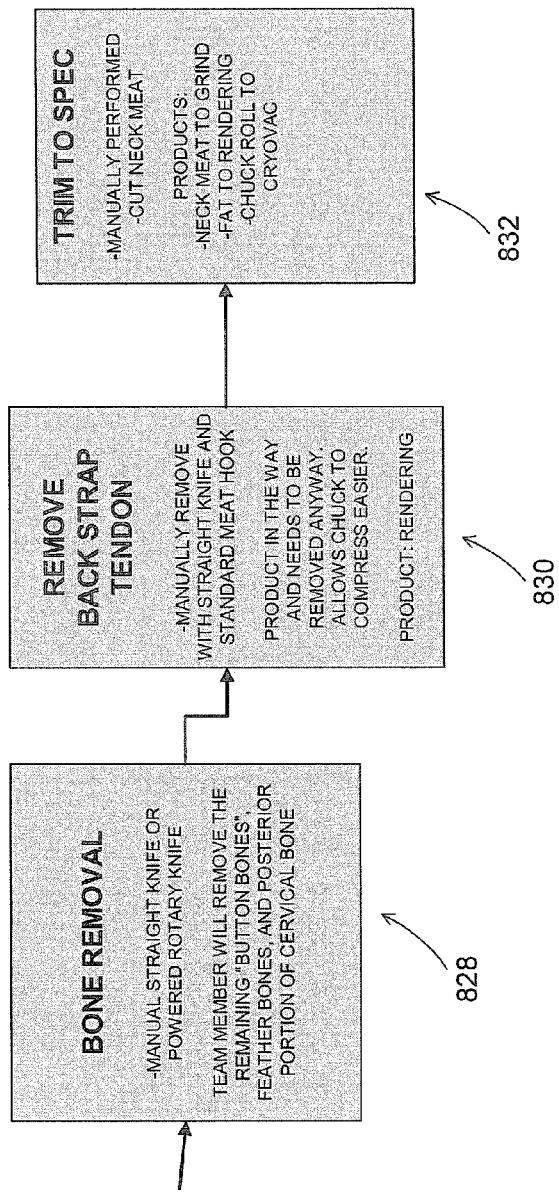

Referring to FIGS. 8A-8C, a functional flow diagram is shown of the bone removal process that can be implemented utilizing the apparatus as described herein. The bone removal process can go through an initial primal cut division and bone removal prior to operation on a sub-primal cut utilizing the present invention. The initial steps in the process 802 as shown, describes the process for separating out the chuck blade for further operation. The chuck blade can be scribed 804 along the membrane interface between the chuck blade and the chuck cap fat and the chuck cap can be lifted and attached to a scissor hook 806 as described by functional flow block 804 and 806. The sub-primal cut can be suspended from the scissor hook to utilize its weight to facilitate removal of the fat from the chuck blade 807. A similar method can be utilized on other sub-primal cuts that have two major portions as in this case there is a chuck cap and the main chuck blade portion separated by a membrane.

Once the suspended chuck blade is separated into the chuck cap and the main chuck blade as reflected by functional blocks 806, 808 and 810, the chuck cap can be routed separately for further processing as represented by functional blocks 810 and 811. The chuck blade can be routed in a different direction for further processing. The flap meat 809, the rope meat 805 and the neck meat can be removed at various stages of the process. The chuck blade can be then sent to a fixturing station as represented by functional block 816 where the operator will place the meat cut in the holding fixture 817 and then place over the meat cut a top compression plate for holding the meat in place and then compressing the meat with a compression plate and then locking in place. The holding fixture is then rolled or conveyed over to the cutting station for the first cut as represented by functional block 818. The holding fixture can be aligned at the cutting station by utilizing the drive dogs to interface with a guide rail and a drive chain. This aligns to the meat cut for being cut by the first and second circular saws as represented by functional blocks 818 and 822. The holding fixture can be rolled to the second stage and the other dogs can be aligned on the second stage guide rail and a second set of cuts can be performed 822. The sub-primal meat cut can then be removed from the holding fixture as represented by functional block 824 for further processing such as any remaining bone removal 828 to be done manually as represented by functional block 828. The chuck blade can then be transferred for further processing 830 and 832.

Referring FIGS. 8A, 8B, and 8C, the process flow for bone removal of the chuck blade is shown. The following description is an overview of five stages of the process. The first stage is the marking and preparation portion of the chuck line process. The blade portion of the chuck sub-primal will be separated from the arm and foreshank portion and the blade will have the apple bone, atlas bone, supraspinatus (mock tender), and anterior rope meat. After separation, the blade portion will be deposited onto one conveyor and the arm and foreshank will be deposited onto a separate conveyor. The apple bone, atlas bone, supraspinatus, and rope meat will be removed with a manual straight knife.

The second stage in the process is the chuck cap removal and fixturing. A scissors hook and overhead chain rail will be used to assist in the separation of the chuck from the chuck fat cap. An operator will make a scribe cut along the outer edge of the piece between the fat cap and the lean to allow a place to secure a scissors hook which is connected to the chain rail. As the chain rail indexes, the chuck blade will slide down and hang suspended by the scissors hook and chuck cap. Hanging by the chuck cap can allow utilization of the weight of the lean portion to assist in the separation of the cap from the lean. This can be performed by the use of a manual straight knife where small cuts will be made in the membrane separating the lean and the cap. The lean portion can be allowed to fall onto a conveyor directly below bone side down and the cap can remain suspended and index to a point where it is above an upgrade table where it can automatically release onto that table.

With the chuck continuing on the cap conveyor, an operator can remove the flap meat and anterior neck meat from the chuck with the use of a straight knife. These portions are generally used in various ground beef mixes and needs to be removed to create more flat surface for fixturing. The chuck can continue on that conveyor and fall onto a separate conveyor which can be located at a height below the cap conveyor allowing the chuck, as it falls, to flip over 180 degrees (lean to bone) leaving the lean side down and the bone side up. Having the bone side up can allow the operator to line up the chuck with the sawing apparatus using the exposed spinal channel as a visual alignment guide. An operator can now position the chuck into a fixturing plate which will be oriented parallel and on the same plane as the chuck so that no lifting, only positioning and sliding of the chuck is required. The chuck will be positioned and aligned with the sawing apparatus with the use of mechanical alignment.

The third stage is the first of two similar sawing operations. The fixture and chuck would index into the first sawing apparatus which could be manually adjusted or could automatically adjust the whole apparatus to the proper height from information gathered through an automatic adjustment mechanism such as for example a mechanical mechanism or an electronic photo eye. After the cut is finished, the cut will release the chuck and return to the starting position.

The fourth stage will be a similar apparatus as the third stage but with the circular saw blade orientated in a horizontal position to the conveyor. The machine will capture and make the cut in the same way as the third stage. The $3^{rd}$ and $4^{th}$ stages constitutes cut #1, but a similar cut #2 can also be performed with the meat cut engaging cut #2 at a different angle due to the curvature of the bone structure geometry.

A more detailed description of the four stage process is as follows. A halved carcass as shown in FIG. 1 is the beginning of the process steps as represented by the functional block for carcass . The next step is drop front ¼, which separates the front quarter of the halved carcass from the rear as reflected by the division lines of FIG. 1. The front ¼ primal cut contains three sub-primal cuts—the foreshank, blade and the arm. A band saw can be used to separate the 1. foreshank; 2. blade; and 3. arm as reflected by functional block. The blade sub-primal continues through the flow as indicated by functional block.

The apple bone can be manually removed with a straight knife, which is a product that is then sent to rendering as shown by functional block. The anterior rope meat can then be manually removed with a straight knife in order to expose the bone structure for anatomical positioning of saw and the rope meat product is sent to grind. The mock tender is also removed manually with straight knife and the mock tender product is sent to trim table for upgrade and then to Cryovac machine.

Now the chuck blade is prepared to remove the chuck blade fat cap. This is performed by making an incision or scribe cut on one end of the meat cut along the line of the membrane between the cap and the primary lean portion. The cap can be removed manually with a straight knife while hanging it from a scissors hook to facilitate separation of the chuck cap. The cap portion along the incision can be raised and attached to the scissors hook thereby attaching to scribed chuck cap fat. Removing the cap from the blade also removes fat from the chuck blade by manually removing the cap with straight knife. The weight of chuck while suspended from the scissor hook can be used to assist with removal. The cap stays on the over head conveyor attached on the scissors hook and exits on scissors hook and exits onto a trim/upgrade conveyor. The chuck falls onto one conveyor and the chuck cap falls onto a separate trim/upgrade conveyor for upgrade products. The trimmed fat can be sent to rendering lean to grind. The flap meat and anterior neck meat can be manually removed from the chuck with a straight knife and the product can be sent to grind.

The fixturing can be designed such that the chuck flips as it falls onto the load conveyor such that the bone faces upward for fixturing and alignment. The fixturing station operator can position the chuck in fixture with the bone side up and can align the spinal channel with the saw via an alignment mechanism such as for example a mechanical mechanism or a laser line. The alignment mechanism can be utilized to track the line of the spinal channel and thereby guide the cut of the saw.

Figure 9:
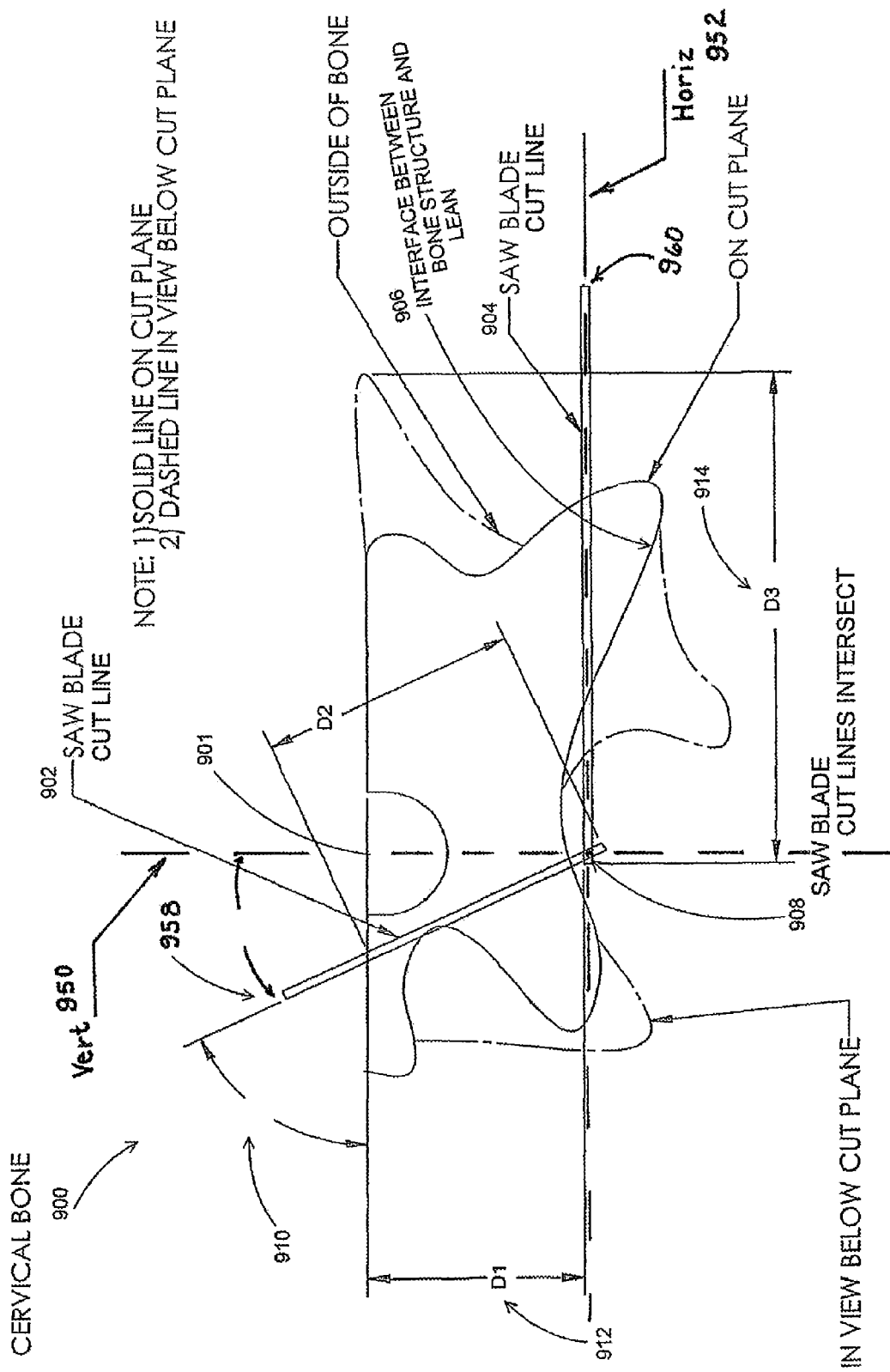
FIG. 9 illustrates a cervical bone cut.

The fixture on which the chuck is positioned can be operable to convey and index the chuck into engagement with a first saw. The saw can adjust to the proper vertical height and lateral horizontal position for the chuck based on the size of a given chuck. The chuck stops as the conveyor indexes to a point where the guide member or other guide means can engage at the bottom of spinal channel and above the atlas bone on cervical portion of bone such that the saw can be guided to perform the cut as reflected. The first saw cut can make a cut at an acute angle between vertical, such as for example can make an acute angle relative to horizontal on posterior side of neck bone. The second saw fixture can capture and cut the chuck in the same way as the first fixture or station and make a horizontal cut beneath the top of neck bone. The off-vertical angled and off-horizontal cuts are depicted in FIG. 9. The depth D1 and D2 of the off-vertical cut line 902 and the breadth D3 of the off-horizontal cut line 904 can vary depending on how far the saw blade is extended and at what angle it is adjusted. The same is true for the other cut line. The saw blade cut lines are shown to intersect at 908. The cut line 904 is shown proximate the interface between the bone structure and the lean. Positioning the cut line proximate the interface assists in removing the majority of the bone with single pass. The cut-line 904 is shown substantially horizontal but the cut line can vary off-horizontal as needed. The off-vertical angle of cut line 902 can also vary.

One embodiment of the present invention is a method for removing a bone from a sub-primal meat cut includes the step of suspending a meat cut having a bone structure extending from a first end to a second distal end of the meat cut and having a bone structure extending from a first end to a second distal end of the meat cut from a scissor hook, see FIGS. 3 and 4 by attaching a severed fat cap portion, see item 250 of FIG. 2B, in the scissor hook and completely separating the fat cap portion from the meat cut. The method also includes the step of mounting the meat cut on a holding fixture, See FIGS. 5A-5L, having the bone structure facing upward by compressing the meat cut between a horizontally sliding compression plate, a bottom plate, a top plate and an anchor wall of the holding fixture.

The process further includes the step of aligning guide dogs attached to the holding fixture on a track rail for guiding the holding fixture along a cutting path 411, see FIG. 4. The process includes yet a further step of capturing the drive dogs with drive links attached to a belt of a conveyor and driving the holding fixture along the path defined by the track rail. The method also includes the step of conveying the holding fixture having the meat cut mounted on said holding fixture in a direction toward a first saw with the first end leading; and cutting a first cut line 932 proximately along a first interface between the bone structure and the lean with the first saw from the first end through the second end of the meat cut where the cut line is at an angle less than 45 degrees with respect to horizontal. The method can also include the step of conveying the holding fixture having the meat cut mounted on said holding fixture in a direction toward a second saw with the first end leading; and cutting a second cut line proximately along a second interface between the bone structure and the lean with the second saw from the first end through the second end of the meat cut where the second cut line 934 is at an angle less than 45 degrees with respect to vertical, where the first and second saw cuts intersect. See FIG. 5E for a representative saw blade arrangement 708 and 716 and a cut line intersection 640.

Another embodiment of the invention is a method for removing a bone from a sub-primal meat cut comprising the steps of removing a fat cap portion from a meat cut having a bone structure extending from a first end to a second distal end of the meat cut with the bone exposed on one side of the meat by scribing along a line, see item 252 of FIGS. 2A and 2B, between the fat cap portion and the main lean portion of the meat cut using a cutting means thereby separating a scribed portion of the fat cap portion from the lean portion. The method further includes the step of lifting the scribed portion of the fat cap separated by the scribing and attaching the scribed portion of the fat cap in a scissor hook and lifting the scissor hook thereby suspending the meat cut. These steps can be performed in preparation for engagement of the saw configuration as shown in FIG. 6.

The method can further include the step of completely separating the fat cap portion from the main lean portion using a cutting means allowing the weight of the main lean portion to assist in the separation; and allowing the main lean portion to fall engaging a diverter means causing the main lean portion to rest on a conveyor with the bone facing down. The method can further include the step of mounting the meat cut onto a holding fixture with the bone exposed on one side of the meat cut facing upward; and conveying the holding fixture having the meat cut mounted on said plate in a direction toward a first saw with the first end leading. See FIG. 6 for saw arrangement.

Figure 9A:
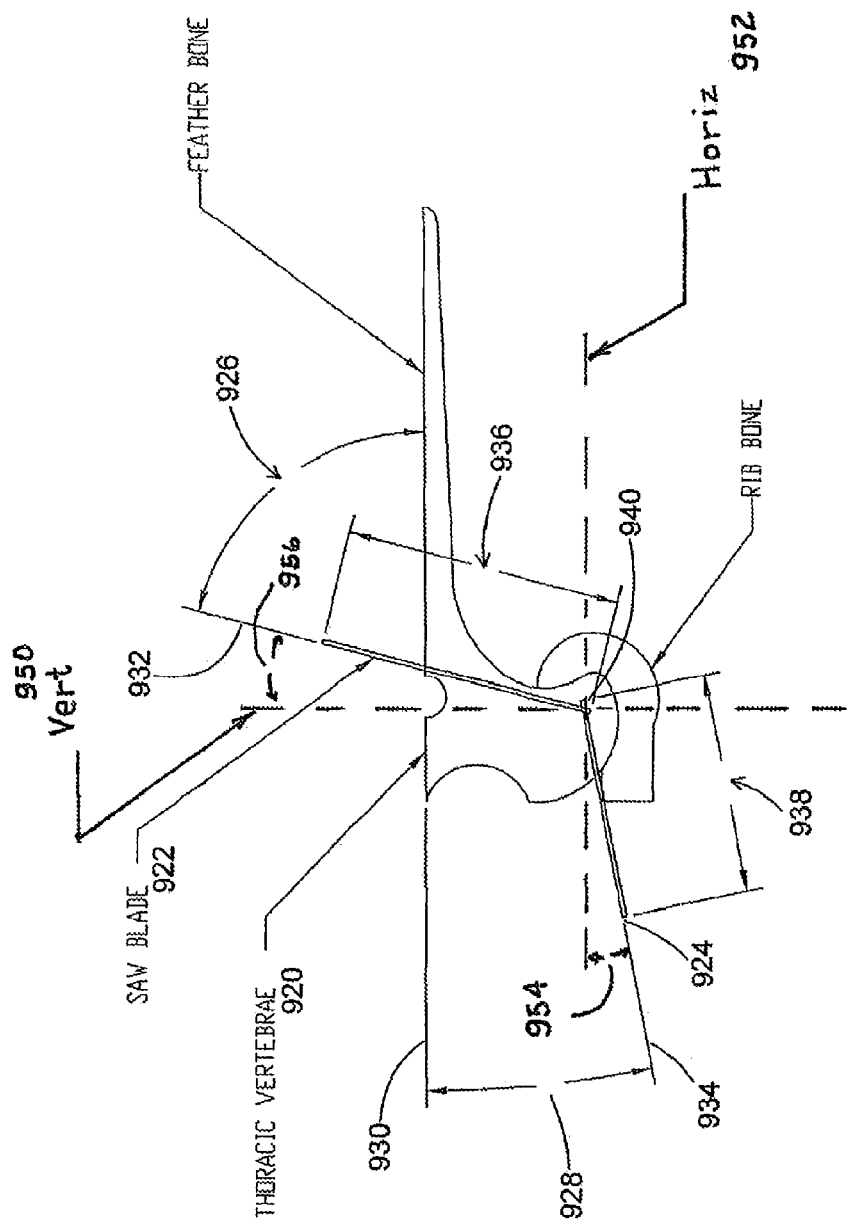
FIG. 9A illustrates a rib bone cut.

The method can further include the step of cutting a first cut line, see item 904 of FIG. 9, proximately along a first interface, see item 906 of FIG. 9, between the bone structure and the lean with the first saw from the first end through the second end of the meat cut at an acute angle with respect to horizontal, See angles 954 and 960; and conveying the holding fixture having the meat cut mounted on said holding fixture in a direction toward a second saw with the first end leading; and cuffing a second cut line, see 902 of FIG. 9, proximately along a second interface between the bone structure and the lean with the second saw from the first end through the second end of the meat cut at an acute angle with respect to vertical, See angles 958 and 956, where the first and second cuts intersect, see item 908 of FIG. 9. FIG. 9 illustrates a cut that can be made on the cervical bone end of a chuck blade. FIG. 9A illustrates a cut that can be made on the thoracic end of the bone structure of a chuck blade. The saw blades 922 and 924 are shown having but lines 932 and 934 which intersect at 940. The depths of the cuts are represented by 936 and 938. The angles of the cuts are 926 and 928.

One embodiment for accomplishing the above methods is an apparatus for removing a bone structure from a meat cut comprising a cutting station, having cutting path 411 with a start position 432 and a downstream end position 434 and said cutting station having mounted thereon at a first position along the cutting path a first saw 414 having a first rotating circular blade positioned to make a first cut line angled less than 45 degrees off horizontal 952, See angles 960 and 954, and having mounted thereon at a second position along the cutting path a second saw 416 having a second rotating circular blade positioned to make a second cut line having an angle of less than 45 degrees off vertical 950, See angles 956 and 958, and where the first and second cut lines intersect. The cutting station can have a track rail mounted thereon and aligned along the cutting path 411; and a meat cut holding fixture having an upper opening 530 for providing access to an exposed bone structure of a meat cut. The holding fixture can have attached thereto dog drives which ride on the track rail for guiding the holding fixture along the cutting path and said holding fixture further having casters 520 attached to the underside of the holding fixture for facilitating tranverse motion.

Figure 10F:
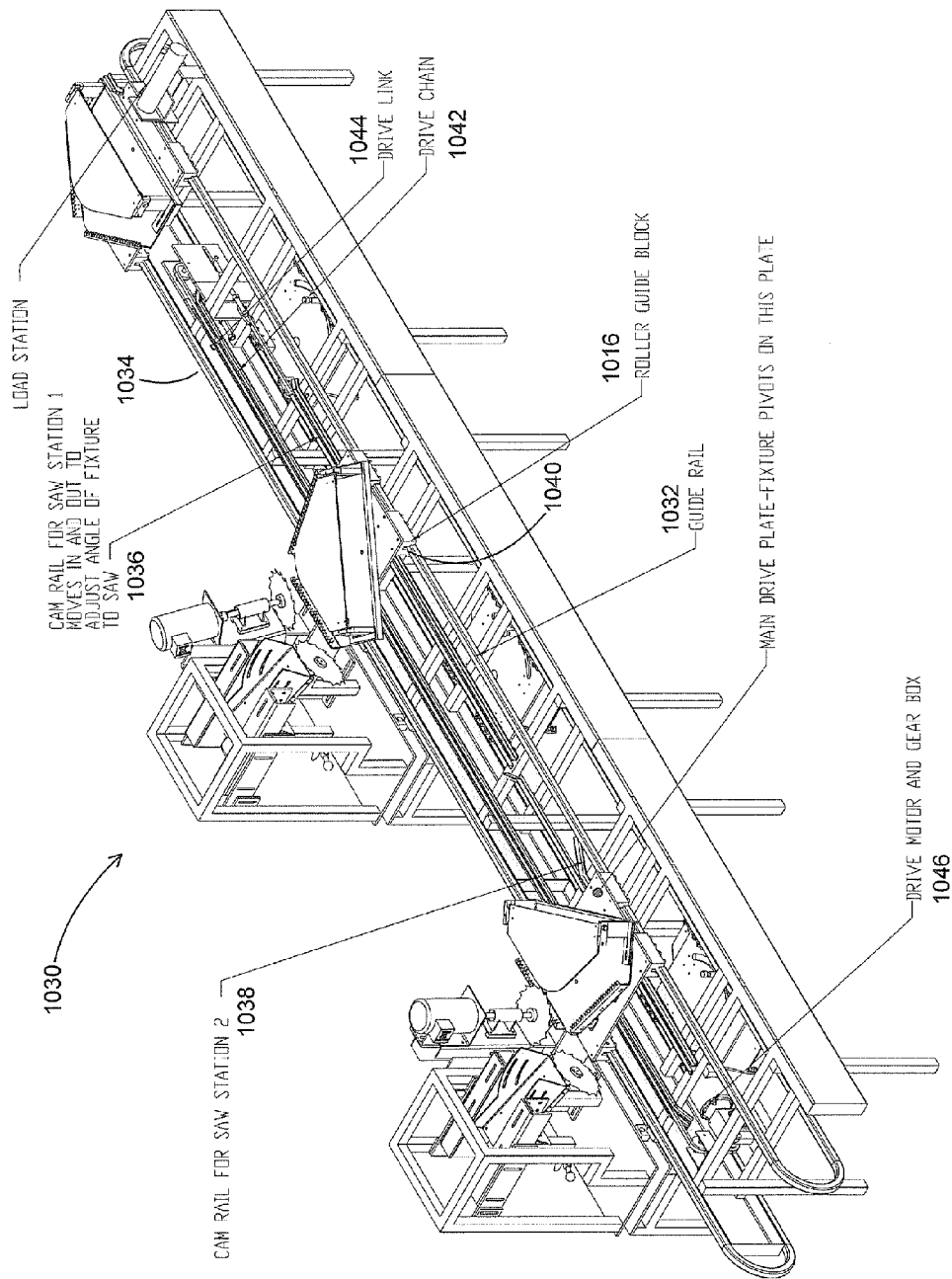
Figure 10G:
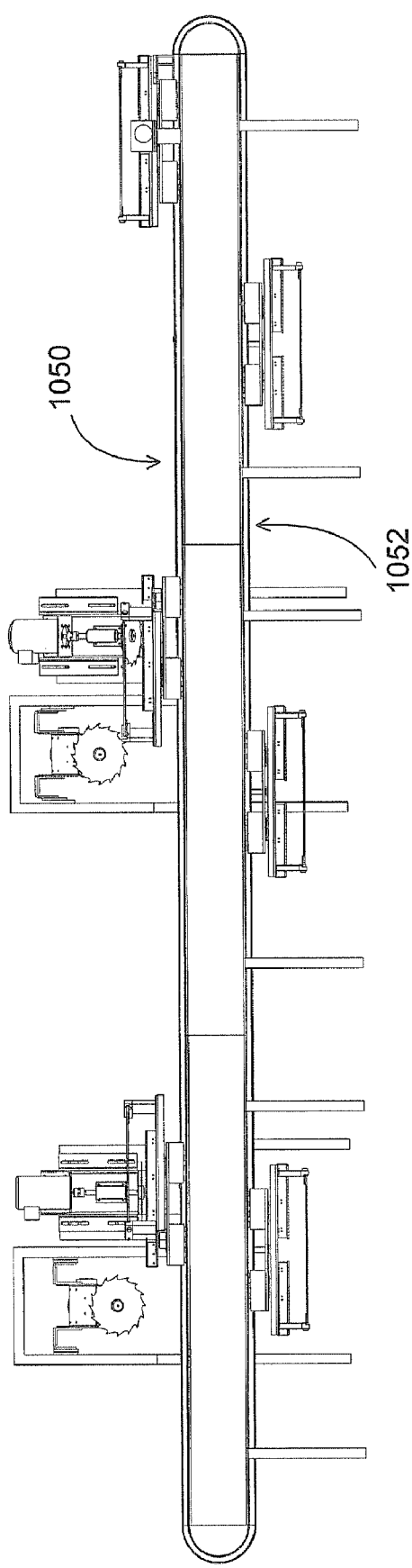

The present invention can comprise an alternative embodiment holding fixture and track rail drive system. Referring to FIGS. 10A through 10F, an alternative embodiment of the holding fixture and track rail drive system is shown. FIG. 10A shows a perspective view of a mounting fixture 1002 similar to the mounting fixture shown in FIGS. 5A through 5L minus the underlying rollers and drive dogs located on the side rails. The mounting fixture 1002, however, is similar in that it has a top plate 1004 a ratchet assembly 1012 for ratcheting down the top plate towards the bottom plate 1006. Further, the mounting fixture similarly includes side rails 1008 with teeth 1010. The mounting fixture 1002 is pivotally mounted on a main drive plate 1014 where the pivot position is indicated by pivot mount 1018.

The main drive plate has mounted on its underside roller guide blocks designed to track along a track rail, which extends along the cutting path extending adjacent the cutting stations. FIG. 10B shows a bottom perspective view of the mounting fixture and main drive plate. The bottom perspective view reveals the pivot pin 1018 about which the mounting fixture pivots in relationship to the main drive plate. Also, the bottom perspective view reveals a slot 1020 in the main drive plate where a cam follower extends from the mounting fixture through the slot such that the overall fixture can track along cam rails extending along the cutting path, which extends adjacent the cutting stations.

FIG. 10C shows a top plan view of the fixture where the mounting fixture having a fixture plate 1006 is mounted atop the main drive plate 1014. This top plan view also shows the path of the cut 1024 or saw path that is accomplished when the fixture is conveyed adjacent the cutting stations. FIG. 10D shows a side plan view of the fixture. A drive dog 1028 is shown that is driven by a drive link and a drive chain that extends along the cutting path adjacent the cutting stations. The side view also reveals roller balls 1026, which allow the mounting fixture to pivot in relationship to the main drive plate while maintaining a fixed distance between the two as defined by the height of the roller ball 1026, which facilitates pivoting. The side view also reveals the pivot pin 1018 about which the mounting fixture pivots in relationship to the main drive plate 1014.

FIG. 10E shows the opposing side view, which further reveals the roller guide blocks 1016 which further comprise roller wheels 1015 and roller wheels 1017 which track along guide rails which extend along the cutting path adjacent the cutting stations. The roller guide blocks also include a recessed area 1019 which tracks over the track rails.

FIG. 10F shows the overall cutting system utilizing the alternative embodiment of the mounting fixture combined with the main drive plate. This alternative system 1030 includes guide rails 1032 and 1034 which extend along the cutting path adjacent the two cutting stations. It is along these guide rails that the roller guide blocks track to guide the mounting fixture to engage the cutting saws. The main drive plate upon which the mounting fixture is mounted is driven by the drive link 1044 and the drive chain 1032. The drive link 1044 engages the drive dog 1028 on the underside of the main drive plate, thereby driving and conveying the fixture along the guide rails extending along the cutting path. The mounting fixture can be pivoted about the pivoting point and further aligning the cam follower with the cam rail 1036 such that the mounting fixture is appropriately positioned for the first cutting station. In a similar matter, the mounting fixture can be pivoted about the pivoting point to align the cam follower with the cam rail 1038, again to appropriately position the mounting fixture for the second cutting station. The drive link and drive chain that conveys or drives the mounting fixture can be driven by a drive motor 1046.

The cam rails 1036 and 1038 can be laterally adjusted with respect to the cutting path (i.e. moved towards and away from the cutting stations), which has the effect of adjusting the pivoting angle of the holding fixture with respect to the main drive plate. Adjusting the pivot position of the holding fixture with respect to the main drive plate will effect the position of the meat cut mounted in the holding fixture thereby effecting the positioning of the meat cut when it is engaged by the cutting saws.

The slot 1020 defines the rotational range of motion for the holding fixture with respect to the main drive plate 1014. The cam follower as it transitions along the slot reflects the rotational position of the holding fixture. The cam rails as they are laterally adjusted and aligned with the cam follower will define the position of the cam follower along the length of the slot and thereby define the rotational position of the holding fixture with respect to the main drive plate. The slot of course can have a greater length than that reflected in the figure without departing from the scope of the invention. Similarly, the cam rails lateral positioning range can vary significantly without departing from the scope of the invention.

As shown in the top plan view of FIG. 10C one of the side rails 1008 with teeth 1010 is shown essentially in parallel with one edge of the main drive plate, which is reflective of the position of the cam follower as shown in the bottom perspective view of FIG. 10B. If the cam rail were laterally moved to thereby move the cam follower to the opposing end of the slot when aligned then the holding fixture is rotated with respect to the main drive plate to thereby align the other side rail with the edge of the main drive plate.

In FIG. 10F the main drive plate is shown essentially tracking on top of the guide rails 1032 and 1034 and being driven along by the drive link 1044, which engages the drive dog 1028. Alternatively the main drive plate can be affixed or retained to the drive link and guide rail system such that the main drive plate is retained and travels along an endless rail loop 1032 as it travels along the top run 1050 of the drive chain system 1046 along the cutting path extending adjacent the cutting stations and further returns along a return path as it travels along the return bottom run 1052 of the drive link system. The drive dog 1028 is captured and driven by drive link 1044. The saw stations can also have cam rails 1036 and 1038 which move laterally toward and away from the cutting stations, in order to adjust the pivoting angle of the holding fixture with respect to the main drive plate by adjusting the cam follower 1022 along guide slot 1020. The chain drive system 1042 can be driven by motor 1046.

The various bone removal system examples shown above illustrate a novel apparatus and method for remove a bone structure from a primal or sub-primal cut of meat, more specifically a chuck blade. A user of the present invention may choose any of the above embodiments, or an equivalent thereof, depending upon the desired application. In this regard, it is recognized that various forms of the subject bone removal invention could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

What is claimed is:

1. A method for removing a bone from a sub-primal meat cut comprising the steps of:
    mounting a meat cut having a bone structure extending from a first end to a second distal end of the meat cut onto a holding fixture with the bone exposed on one side of the meat cut and facing upward;
    conveying the holding fixture having the meat cut mounted on said holding fixture in a direction toward a first saw with the first end leading;
    cutting a first cut line proximately along a first interface between the bone structure and the lean with the first saw from the first end through the second end of the meat cut where the cut line is at an angle less than 45 degrees with respect to horizontal;
    conveying the holding fixture having the meat cut mounted on said holding fixture in a direction toward a second saw with the first end leading; and
        cutting a second cut line proximately along a second interface between the bone structure and the lean with the second saw from the first end through the second end of the meat cut at an angle less than 45 degrees with respect to vertical.

2. The method as recited in claim 1, where said first and second cut lines intersect.

3. The method as recited in claim 2, where said holding fixture has dog drives attached thereto and further comprising the step of aligning the dog drive on a track rail for aligning the meat cut with the saws.

4. The method as recited in claim 3, further comprising the step of capturing the dog drive with a drive link of a conveyor and driving the dog drive for engaging the meat cut with the saws.

5. The method as recited in claim 4, further comprising the steps of adjusting the first and second saws to adjust the first and second cut lines.

6. A method for removing a bone from a sub-primal meat cut comprising the steps of:
    mounting a meat cut having a bone structure extending from a first end to a second distal end of the meat cut onto a holding fixture with the bone exposed on one side of the meat cut and facing upward by compressing the meat cut between a horizontally sliding compression plate, a bottom plate, a top plate and a side rail anchor of the holding fixture;
    aligning drive dogs attached to the mounting fixture on a track rail for guiding the mounting fixture along a path;
    capturing the drive dogs with drive links attached to a belt of a conveyor driving the holding fixture along the path defined by the track rail;
    conveying the holding fixture having the meat cut mounted on said holding fixture in a direction toward a first saw with the first end leading;
    cutting a first cut line proximately along a first interface between the bone structure and the lean with the first saw from the first end through the second end of the meat cut with the first cut line is at an angle less than 45 degrees with respect to horizontal;
    conveying the holding fixture having the meat cut mounted on said holding fixture in a direction toward a second saw with the first end leading; and
        cutting a second cut line proximately along a second interface between the bone structure and the lean with the second saw from the first end through the second end of the meat cut where said second cut line is at an angle less than 45 degrees with respect to vertical, where the first and second saw cut lines intersect.

7. The method as recited in claim 6, where the step of compressing the meat cut includes compressing with a compression cylinder the horizontally sliding compression plate causing the meat cut to compress against the top plate exposing the bone structure.

8. The method as recited in claim 7, further comprising the step of adjusting the first and second saws thereby adjusting the first and second cut lines horizontally, vertically, and angularly.

9. A method for removing a bone from a sub-primal meat cut comprising the steps of:
    suspending a meat cut having a bone structure extending from a first end to a second distal end of the meat cut and having a bone structure extending from a first end to a second distal end of the meat cut from a scissor hook by attaching a severed fat cap portion in the scissor hook and completely separating the fat cap portion from the meat cut;
    mounting the meat cut onto a holding fixture having the bone structure facing upward by compressing the meat cut between a horizontally sliding compression plate, a bottom plate, a top plate and a side rail anchor of the holding fixture;
    aligning drive dogs attached to the holding fixture on a track rail for guiding the holding fixture along a path;
    capturing the drive dogs with drive links attached to a belt of a conveyor driving the holding fixture along the path defined by the track rail;
    conveying the holding fixture having the meat cut mounted on said holding fixture in a direction toward a first saw with the first end leading;
    cutting a first cut line proximately along a first interface between the bone structure and the lean with the first saw from the first end through the second end of the meat cut where the cut line is at an angle less than 45 degrees with respect to horizontal;
    conveying the holding fixture having the meat cut mounted on said holding fixture in a direction toward a second saw with the first end leading; and
        cutting a second cut line proximately along a second interface between the bone structure and the lean with the second saw from the first end through the second end of the meat cut where the second cut line is at an angle less than 45 degrees with respect to vertical, where the first and second saw cuts intersect.

10. The method as recited in claim 9, where the step of compressing the meat cut includes compressing with a compression cylinder the horizontally sliding compressing plate causing the meat cut to compress against the top plate.

11. The method as recited in claim 10, further comprising the step of adjusting the first and second saws thereby adjusting the first and second cut lines horizontally, vertically, and angularly.

12. A method for removing a bone from a sub-primal meat cut comprising the steps of:

removing a fat cap portion from a meat cut having a bone structure extending from a first end to a second distal end of the meat cut with the bone exposed on one side of the meat by scribing along a line between the fat cap portion and the main lean portion of the meat cut using a cutting means thereby separating a scribed portion of the fat cap portion from the lean portion;

lifting the scribed portion of the fat cap separated by the scribing and attaching the scribed portion of the fat cap in a scissor hook and lifting the scissor hook thereby suspending the meat cut;

completely separating the fat cap portion from the main lean portion using a cutting means allowing the weight of the main lean portion to assist in the separation;

allowing the main lean portion to fall engaging a diverter means causing the main lean portion to rest on a conveyor with the bone facing upward;

mounting the meat cut onto a holding fixture with the bone exposed on one side of the meat cut facing upward;

conveying the holding fixture having the meat cut mounted on said plate in a direction toward a first saw with the first end leading;

cutting a first cut line proximately along a first interface between the bone structure and the lean with the first saw from the first end through the second end of the meat cut at an acute angle with respect to horizontal;

conveying the holding fixture having the meat cut mounted on said holding fixture in a direction toward a second saw with the first end leading; and cutting a second cut line proximately along a second interface between the bone structure and the lean with the second saw from the first end through the second end of the meat cut at an acute angle with respect to vertical, where the first and second cuts intersect.

13. The method as recited in claim 12, where the step of compressing the meat cut includes compressing with a compression cylinder the horizontally sliding compressing plate causing the meat cut to compress against the top plate.

14. The method as recited in claim 13, further comprising the step of adjusting the first and second saws thereby adjusting the first and second cut lines horizontally, vertically, and angularly.

15. An apparatus for removing a bone structure from a meat cut comprising:

a cutting station having cutting path with a start position and a downstream end position and said cutting station having mounted thereon at a first position along the cutting path a first saw having a first rotating circular blade positioned to make a first cut line angled less than 45 degrees off horizontal and having mounted thereon at a second position along the cutting path a second saw having a second rotating circular blade positioned to make a second cut line having an angle of less than 45 degrees off vertical, and where the first and second cut lines intersect;

said cutting station having a track rail mounted thereon and aligned along the cutting path; and a meat cut holding fixture having an upper opening for providing access to an exposed bone structure of a meat cut, said holding fixture having attached thereto drive dogs, which ride on the track rail for guiding the holding fixture along the cutting path and said holding fixture further having casters attached to the underside of the holding fixture for facilitating traverse motion.

16. The apparatus as recited in claim 15, where the mounting position is horizontally and vertically adjustable.

17. The apparatus as recited in claim 16, where the meat cut holding fixture further comprises a bottom plate having a front end and a rear end, a compression plate horizontally slideable rear to front and orthogonally oriented with respect to the bottom plate and slidably attached to a bottom plate, a side rail anchor attached to the front end of the bottom plate and a top plate adjustably retained to the bottom plate by a ratcheted interface.

18. A method for removing a bone from a sub-primal meat cut comprising the steps of:

providing a meat cut having a bone structure extending from a first end to a second distal end of the meat cut;

mounting the meat cut onto a holding fixture having the bone structure facing upward by compressing the meat cut between a horizontally sliding compression plate, a bottom plate, a top plate and a side rail anchor of the holding fixture;

pivotally mounting the holding fixture on a main drive plate, where said main drive plate has a dog drive and guide blocks operable to track over guide rails;

aligning drive dogs attached to the main drive plate on the drive rails for guiding the holding fixture along a path;

pivotally positioning the holding fixture with respect to the main drive plate;

capturing the drive dogs with drive links attached to a drive chain of a conveyor driving the holding fixture along the cutting path defined by the track rail;

conveying the holding fixture having the meat cut mounted on said holding fixture in a direction toward a first saw with the first end leading;

cutting a first cut line proximately along a first interface between the bone structure and the lean with the first saw from the first end through the second end of the meat cut where the cut line is at an angle less than 45 degrees with respect to horizontal;

conveying the holding fixture having the meat cut mounted on said holding fixture in a direction toward a second saw with the first end leading; and cutting a second cut line proximately along a second interface between the bone structure and the lean with the second saw from the first end through the second end of the meat cut where the second cut line is at an angle less than 45 degrees with respect to vertical, where the first and second saw cuts intersect.

19. The method as recited in claim 18, further comprising the step of pivotally adjusting the holding fixture with respect to the main drive plate to align.

20. An apparatus for removing a bone structure from a meat cut comprising:

a cutting station having cutting path with a start position and a downstream end position and said cutting station having mounted thereon at a first position along the saw path a first saw having a first rotating circular blade positioned to make a first cut line angled less than 45 degrees off horizontal and having mounted thereon at a second position along the cutting path a second saw having a second rotating circular blade positioned to make a second cut line having an angle of less than 45 degrees off vertical, and where the first and second cut lines intersect;

said cutting station having a track rail mounted thereon and aligned along the cutting path; and a meat cut holding fixture having an upper opening for providing access to an exposed bone structure of a meat cut, said holding fixture pivotally mounted on a main drive plate, said main drive plate having attached thereto drive dogs and slotted roller guide blocks which ride on the track rail for guiding the holding fixture along the cutting path and where said drive dog are positioned to be driven by a drive link of a conveyor drive.

* * * * *

UNITED STATES PATENT AND TRADEMARK OFFICE
CERTIFICATE OF CORRECTION

| | |
|---|---|
| PATENT NO. | : 7,635,294 B2 |
| APPLICATION NO. | : 11/460688 |
| DATED | : December 22, 2009 |
| INVENTOR(S) | : Jerrad L. Tomcak et al. |

It is certified that error appears in the above-identified patent and that said Letters Patent is hereby corrected as shown below:

In Col. 8, line 24, delete "tip" and replace with -- up --

In Col. 14, line 44, delete "cuffing" and replace with -- cutting --

In Col. 20, Claim 20, line 66, delete "cuffing" and replace with -- cutting --

Signed and Sealed this

Sixteenth Day of March, 2010

David J. Kappos
*Director of the United States Patent and Trademark Office*